United States Patent [19]

Akahori et al.

[11] Patent Number: 5,235,046

[45] Date of Patent: Aug. 10, 1993

[54] TRIAZINE COMPOUNDS AND METHOD FOR DYEING OR PRINTING FIBER MATERIALS USING THE SAME

[75] Inventors: Kingo Akahori, Toyonaka; Masayuki Miki, Ashiya; Yutaka Kayane, Ikoma; Takeshi Washimi, Toyonaka, all of Japan

[73] Assignee: Sumitomo Chemical Company, Limited, Osaka, Japan

[21] Appl. No.: 793,096

[22] Filed: Nov. 18, 1991

[30] Foreign Application Priority Data

Nov. 26, 1990 [JP] Japan .................... 2-324961

[51] Int. Cl.$^5$ ............... C09B 62/503; D06P 1/384
[52] U.S. Cl. ...................... 534/618; 534/642; 540/126; 544/187; 8/549
[58] Field of Search .......... 534/618, 642; 540/126; 544/187, 189

[56] References Cited

U.S. PATENT DOCUMENTS

| | | | |
|---|---|---|---|
| 4,740,592 | 4/1988 | Springer et al. | 534/642 |
| 4,757,136 | 7/1988 | Springer et al. | 534/642 |
| 4,775,746 | 10/1988 | Springer et al. | 534/642 |
| 4,780,107 | 10/1988 | Sawamoto et al. | 544/76 X |
| 4,782,140 | 11/1988 | Tzikas | 534/642 X |
| 4,841,032 | 6/1989 | Morimitsu et al. | 534/642 |
| 4,841,033 | 6/1989 | Morimitsu et al. | 534/642 |
| 4,873,321 | 10/1989 | Omura et al. | 534/642 |
| 4,880,431 | 11/1989 | Yokogawa et al. | 534/642 X |
| 4,904,766 | 2/1990 | Yokogawa et al. | 534/642 |
| 4,910,298 | 3/1990 | Yokogawa et al. | 534/642 |
| 4,977,261 | 12/1990 | Kayane et al. | 544/189 |

FOREIGN PATENT DOCUMENTS

| | | |
|---|---|---|
| 76782 | 4/1983 | European Pat. Off. . |
| 0266774 | 5/1988 | European Pat. Off. . |
| 0377166 | 7/1990 | European Pat. Off. . |
| 0385120 | 9/1990 | European Pat. Off. . |
| 63-207864 | 8/1988 | Japan ................. 540/126 |
| 2225019 | 5/1990 | United Kingdom . |

OTHER PUBLICATIONS

Chemical Abstract, vol. 114, 8260c (1991), "Water-soluble, fiber-reactive azo dyes,".
Kagaku to Kogyo, (Science & Industry), pp. 584-594, 42 (1968).

Primary Examiner—Mary C. Lee
Assistant Examiner—Fiona T. Powers
Attorney, Agent, or Firm—Stevens, Davis, Miller & Mosher

[57] ABSTRACT

A triazine compound which is useful for dyeing or printing materials containing hydroxyl group and/or amide group, and which has the following formula (I) or salts thereof

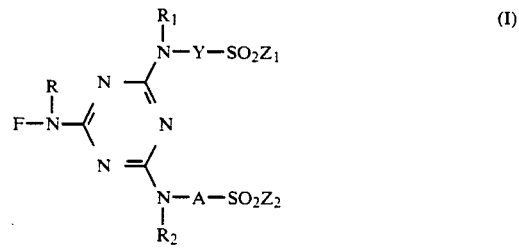

wherein R represents hydrogen or unsubstituted or substituted alkyl; $R_1$ represents hydrogen, an alkyl unsubstituted or substituted by carboxy, sulfo, alkoxy, halogeno, sulfato or hydroxy, or $-Y-SO_2Z_3$; $R_2$ represents hydrogen or unsubstituted or substituted alkyl; A represents unsubstituted or substituted phenylene or naphthylene; Y represents a divalent group which is $C_2-C_7$ alkylene and so on; $Z_1$, $Z_2$ and $Z_3$ independently of one another are each $-CH=CH_2$ or $-CH_2CH_2Z'$ wherein $Z'$ is a group capable of being split by the action of an alkali; and F is any one of the dye residue which is anthraquinone, azo, disazo, trisazo or phthalocyanine nucleus and so on, and a process for dyeing or printing fiber materials which comprises using said triazine compounds or salts thereof.

17 Claims, No Drawings

TRIAZINE COMPOUNDS AND METHOD FOR DYEING OR PRINTING FIBER MATERIALS USING THE SAME

The present invention relates to triazine compounds suitable for use in dyeing and printing materials containing hydroxyl group and/or amide group, particularly those such as cellulose fiber, natural and synthetic polyamide fibers, polyurethane fiber, leather and mixed yarns thereof, to obtain a color fast to light and wetness, as well as application of said compounds.

There are known a variety of compounds having 2 or more vinyl sulfone type reactive groups in one molecule. However, they are yet insufficient from the viewpoint of dyeing performances such as build-up porperty, and a further improvement of these dyes is waited for.

A variety of reactive dyes have hitherto been used extensively for dyeing and printing fiber materials. Today's level of the technique, however, is unsatisfactory from the viewpoint of the high requirements concerning applicability to special dyeing processes and the requirement concerning fastness properties of the dyed products which is becoming higher.

For example, the so far known reactive dyes are unsatisfactory in solubility, dyeing performances such as build-up property, and fastness properties such as fastness to acid hydrolysis, chlorine fastness, etc., and it is intensely desired to develop a more improved dye.

The excellency in build-up property is a very important factor of the dye, because today's dyeing processes have become requiring a more and more elevated economicity. The present inventors have conducted extensive studies with the aim of discovering a novel compound capable of overcoming the above-mentioned faults of the known dyes and extensively fulfilling the necessary conditions which a dye must fulfill, and as a result, the present invention has been accomplished.

The present invention provides triazine compounds represented by the following general formula (I) or salts thereof:

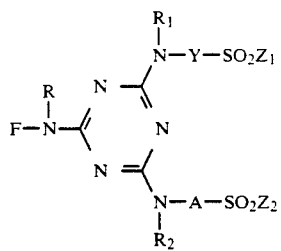

wherein R represents hydrogen or unsubstituted or substituted alkyl; $R_1$ represents hydrogen, an alkyl unsubstituted or substituted by carboxy, sulfo, alkoxy, halogeno, sulfato or hydroxy, or $-Y-SO_2Z_3$; $R_2$ represents hydrogen or unsubstituted or substituted alkyl; A represents unsubstituted or substituted phenylene or naphthylene; Y represents a divalent group represented by the following formula (1), (2) or (3):

$$-CH_2-(W)- \quad (1)$$

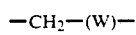

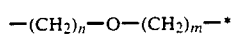

wherein (W) is a straight or branched chain $C_1$-$C_6$ alkylene unsubstituted or substituted by chloro, bromo, fluoro, hydroxy, sulfato, cyano, $C_1$-$C_4$ alkylcarbonyloxy, $C_1$-$C_5$ alkoxycarbonyl, carboxy or carbamoyl; $W_1$ and $W_2$ independently of one another are each a straight or branched chain $C_2$-$C_6$ alkylene; $R_4$ is hydrogen or $C_1$-$C_6$ alkyl; m and n independently of one another are each 1-6; and the mark * means a bond linking to

provided that $CH_2$ or (W) of the formula (1) as Y is linked to

$Z_1$, $Z_2$ and $Z_3$ independently of one another are each $-CH=CH_2$ or $-CH_2CH_2Z'$ wherein $Z'$ is a group capable of being split by the action of an alkali; and F is any one of the following formulas (4) to (19) in the free acid form:

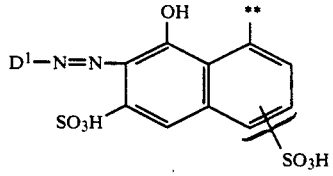

wherein T is an unsubstituted or substituted aliphatic, alicyclic or aromatic bridging group, $m_1$ is 0 or 1, and the mark ** means a bond linking to

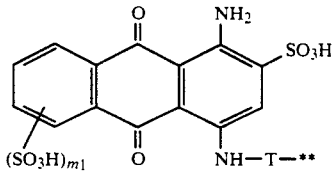

wherein $D^1$ is an unsubstituted or substituted phenyl or naphthyl, and the mark ** is as defined above;

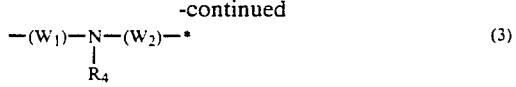

wherein $R^1$ is hydrogen, methyl, methoxy or sulfo, $R^2$ is an unsubstituted or substituted $C_1$-$C_4$ alkyl or phenyl, and the mark ** is as defined above;

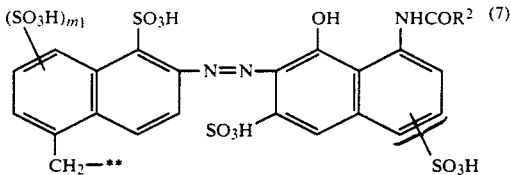 (7)

wherein $m_1$, $R^2$ and the mark ** are as defined above;

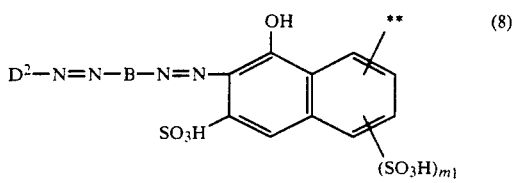 (8)

wherein B is

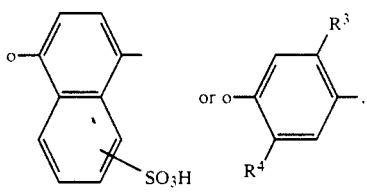

$D^2$ is an unsubstituted or substituted phenyl or naphthyl group, $R^3$ is hydrogen, $C_1$-$C_4$ alkyl, $C_1$-$C_4$ alkoxy or sulfo, $R^4$ is hydrogen, halogeno, $C_1$-$C_4$ alkyl, $C_1$-$C_4$ alkoxy, $C_1$-$C_4$ acylamino, $C_1$-$C_4$ alkylsulfonylamino or ureido, the mark ○ means a bond linking to $D_2$—N=N—, and $m_1$ and the mark ** are as defined above;

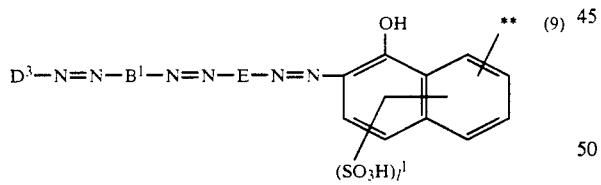 (9)

wherein the mark ** is as defined above, $D^3$ is an unsubstituted or substituted phenyl or naphthyl, $B^1$ is a group represented by

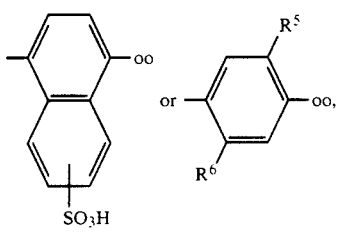

E is a group represented by

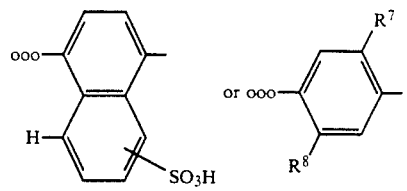

(in these formulas, the mark ○○ means a bond linking to the azo group of —N=N—E—, the mark ○○○ means a bond linking to the azo group of —N=N—$B^1$—, $R^5$ and $R^7$ independently of one another are each hydrogen, $C_1$-$C_4$ alkyl, $C_1$-$C_4$ alkoxy or sulfo, and $R^6$ and $R^8$ independently of one another are each hydrogen, halogeno, $C_1$-$C_4$ alkyl, $C_1$-$C_4$ alkoxy, $C_1$-$C_4$ acylamino or ureido) and $l^1$ is 1 or 2;

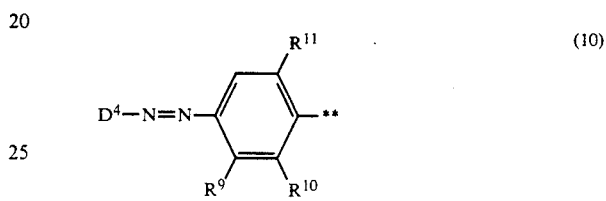 (10)

wherein the mark ** is as defined above, $R^9$ is hydrogen, halogeno, $C_1$-$C_4$ alkyl, $C_1$-$C_4$ alkoxy, $C_1$-$C_4$ acylamino or ureido, $R^{10}$ is hydrogen or, taken together with $R^9$, may form a ring, $R^{11}$ is hydrogen, $C_1$-$C_4$ alkyl, $C_1$-$C_4$ alkoxy or sulfo, and $D^4$ is an unsubstituted or substituted phenyl or naphthyl;

$$D^5-N=N-B^2-N=N-E^1-** \quad (11)$$

wherein the mark ** is as defined above, $B^2$ is a group represented by

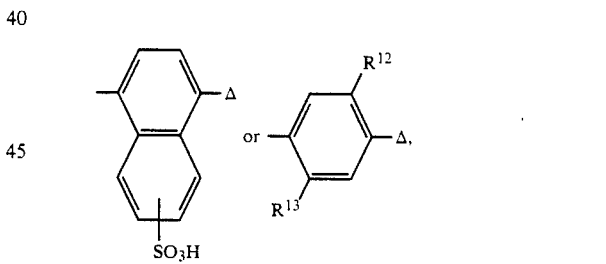

$E^1$ is a group represented by

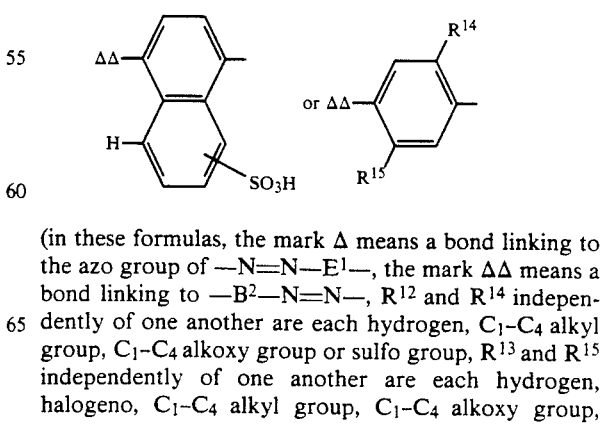

(in these formulas, the mark Δ means a bond linking to the azo group of —N=N—$E^1$—, the mark ΔΔ means a bond linking to —$B^2$—N=N—, $R^{12}$ and $R^{14}$ independently of one another are each hydrogen, $C_1$-$C_4$ alkyl group, $C_1$-$C_4$ alkoxy group or sulfo group, $R^{13}$ and $R^{15}$ independently of one another are each hydrogen, halogeno, $C_1$-$C_4$ alkyl group, $C_1$-$C_4$ alkoxy group, $C_1$-$C_4$ acylamino group or ureido group), and $D^5$ is an unsubstituted or substituted phenyl or naphthyl;

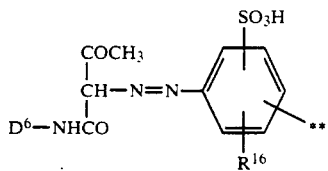
(12)

wherein the mark ** is as defined above, $R^{16}$ is hydrogeno, methyl or sulfo, and $D^6$ is an unsubstituted or substituted phenyl or naphthyl;

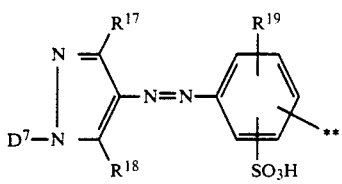
(13)

wherein the mark ** is as defined above, $R^{17}$ is methyl group, carboxyl group or $C_1$-$C_4$ alkoxycarbonyl group, $R^{18}$ is hydroxyl group or amino group, $R^{19}$ is hydrogen, methyl group or sulfo group, and $D^7$ is an unsubstituted or substituted phenyl or naphthyl;

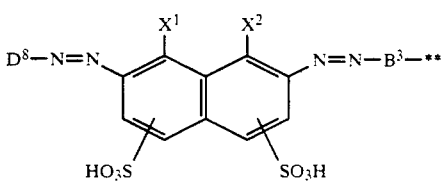
(14)

wherein the mark ** is as defined above, $B^3$ is a group represented by the following formula:

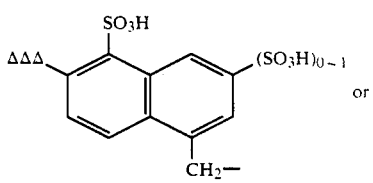

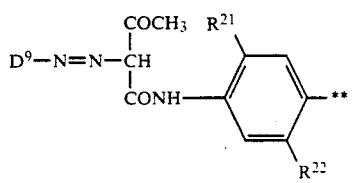

(in these formulas, the mark ΔΔΔ means a bond linking to an azo group, and $R^{20}$ is hydrogen, methyl, methoxy or sulfo), one of $X^1$ and $X^2$ is $NH_2$ group and the other is OH group, and $D^8$ is an unsubstituted or substituted phenyl or naphthyl;

(15)

wherein the mark ** is as defined above, one of $R^{21}$ and $R^{22}$ is sulfo group and the other is hydrogen, methoxy group or ethoxy group and $D^9$ is an unsubstituted or substituted phenyl or naphthyl;

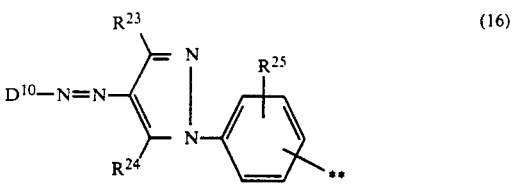
(16)

wherein the mark ** is as defined above, $R^{23}$ is methyl, carboxyl or $C_1$-$C_4$ alkoxycarbonyl, $R^{24}$ is hydroxyl or amino, $R^{25}$ is hydrogen, methyl or sulfo, and $D^{10}$ is an unsubstituted or substituted phenyl or naphthyl:

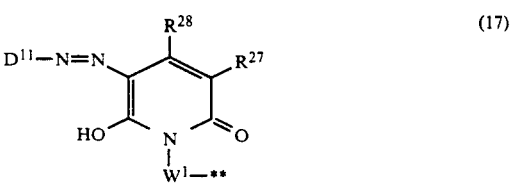
(17)

wherein the mark ** is as defined above, $R^{27}$ is hydrogen, cyano group, carbamoyl group, sulfo group, sulfomethyl group or halogeno, $R^{28}$ is $C_1$-$C_4$ alkyl, $D^{11}$ is an unsubstituted or substituted phenyl or naphthyl, and $W^1$ is $C_2$-$C_6$ alkylene group;

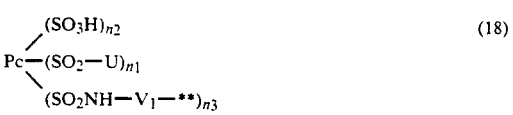
(18)

wherein the mark ** is as defined above, Pc particularly represents the phthalocyanine nucleus of copper phthalocyanine or nickel phthalocyanine, U is an unsubstituted or substituted amino group, $V_1$ is an aliphatic, alicyclic or aromatic bridging group, $n_1$ is 0, 1 or 2, $n_2$ is 1, 2 or 3, and $n_3$ is 1, 2 or 3, provided that $1 \leq n_1+n_2+n_3 \leq 4$ and $1 \leq n_1+n_2 \leq 3$;

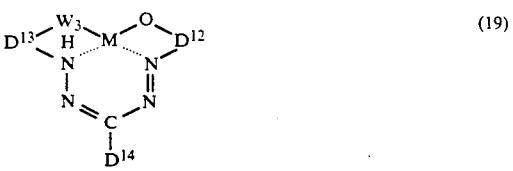
(19)

wherein M is copper or nickel, $W_3$ is —O— or —COO—, $D^{12}$ and $D^{13}$ are each a mono- or polynuclear arylene group bonded at its ortho carbon atoms, and $D^{14}$ is an unsubstituted or substituted aliphatic, alicyclic or aromatic hydrocarbon group, provided that One of $D^{14}$, $D^{12}$ and $D^{13}$ is linked to $$-\underset{R}{\overset{|}{N}}-.$$

a process for producing the triazine compounds or salts thereof, and a process for dyeing or printing fiber materials which comprises using said triazine compounds or salts thereof.

In formula (4), a case that T is a $C_2$-$C_6$ alkylene, a cyclohexylene, a sulfophenylene unsubstituted or substituted by methyl, and $m_1$ is 0 is preferable.

In formula (5), a case that $D^1$ is a phenyl group unsubstituted or substituted once or twice by a substituent selected from the group consisting of methyl, ethyl, methoxy, ethoxy, carboxy, chloro, bromo and sulfo or a naphthyl group unsubstituted or substituted once, twice or thrice by sulfo is preferable, and a case that $D^1$ is represented by the following formula (20) in the free acid form:

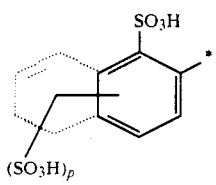

(20)

wherein p is 0 or 1 and * means a bond linking to —N=N— is particularly preferable.

In formula (6) and (7), a case that $R^2$ is a $C_1$-$C_4$ alkyl group or a phenyl group unsubstituted or substituted by methyl, ethyl, methoxy, ethoxy, chloro, bromo, nitro or sulfo is preferable.

In formula (8), (9), (10) and (11), a case that $D^2$, $D^3$, $D^4$ and $D^5$ are each a phenyl group unsubstituted or substituted once or twice by a substituent selected from the group consisting of methyl, ethyl, methoxy, ethoxy, carboxy, chloro, bromo and sulfo or a naphthyl group unsubstituted or substituted once, twice or thrice by a sulfo group is preferable, and a case that $D^2$, $D^3$, $D^4$ and $D^5$ are each a monosulfo- or disulfo-phenyl group or a group represented by the following formula (21) in the free acid form:

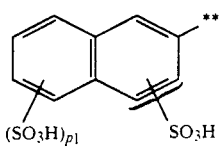

(21)

wherein $p_1$ is 1 or 2 and the mark ** means a bond linking to —N=N— is particularly preferable.

In formulas (12) and (13), a case that $D^6$ and $D^7$ are each a phenyl group unsubstituted or substituted once or twice by a substituent selected from the group consisting of methyl, ethyl, methoxy, ethoxy, carboxy, chloro, bromo and sulfo or a naphthyl group unsubstituted or substituted by sulfo is preferable.

In formula (14), a case that $D^8$ is a phenyl group unsubstituted or substituted by one or two substituent(s) selected from the group consisting of methyl, ethyl, methoxy, ethoxy, carboxy, chloro, bromo, nitro and sulfo or a naphthyl group unsubstituted or substituted by one to three sulfo group(s) is preferable, and a case that $D^8$ represents the following formula (22) in the free acid form:

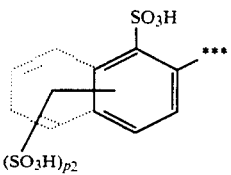

(22)

wherein $p_2$ is 0 or 1 and the mark *** means a bond linking to —N=N— is particularly preferable. $B^3$ represents the following formula in the free acid form:

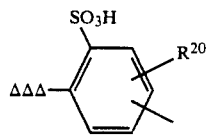

wherein $R^{20}$ and the mark ▲▲▲ are as defined above is preferable.

In formulas (15), (16) and (17), a case that $D^9$, $D^{10}$ and $D^{11}$ are each a phenyl group unsubstituted or substituted once or twice by a substituent selected from the group consisting of methyl, ethyl, methoxy, ethoxy, carboxy, chloro, bromo and sulfo or a naphthyl group unsubstituted or substituted once, twice or thrice by sulfo group is preferable, and a case that $D^9$, $D^{10}$ and $D^{11}$ represent the following formula (23) or (24) in the free acid form:

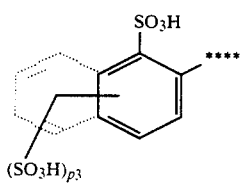

(23)

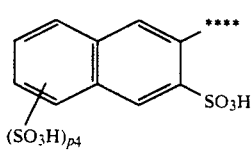

(24)

wherein $p_3$ is 0 or 1, $p_4$ is 1 or 2 and the mark **** means a bond linking to —N=N—, is particularly preferable.

In formula (18), a case that U is an amino and $V_1$ is a $C_2$-$C_6$ alkylene, a cyclohexylene or a phenylene substituted by sulfo is preferable.

As to the formula (19), a case that it represents the following formula (25) in the free acid form:

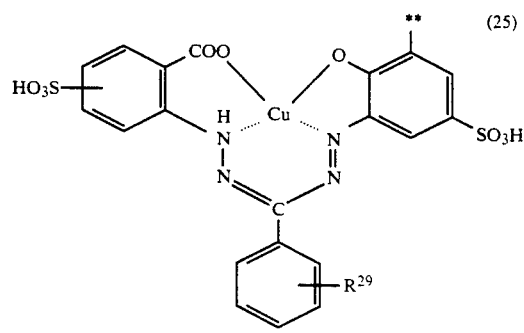

(25)

wherein $R^{29}$ is hydrogen, methyl, methoxy, chloro, bromo, nitro, carboxy or sulfo and the mark ** is as defined above, is particularly preferable.

Specific examples of the compound represented by F-NHR include the followings:

1-amino-4-(4'-aminoanilino)anthraquinone-2,2'-disulfonic acid,
1-amino-4-(4'-methylaminoanilino)anthraquinone-2,3'-disulfonic acid,
1-amino-4-(3'-amino-2',4'-6'-trimethylanilino)anthraquinone-2,5'-disulfonic acid,
1-amino-4-(3'-aminoanilino)anthraquinone-2,4'-disulfonic acid,
8-amino-1-hydroxy-2-(2'-sulfophenylazo)naphthalene-3,6-disulfonic acid,
8-amino-1-hydroxy-2-(2',5'-disulfophenylazo)naphthalene-3,6-disulfonic acid,
8-(3'-aminobenzoylamino)-1-hydroxy-2-(2'-sulfophenylazo)-naphthalene-3,6-disulfonic acid,
8-amino-1-hydroxy-2,2'-azonaphthalene-1'3,5',6-tetrasulfonic acid,
8-amino-1-hydroxy-2-(4'-acetylamino-2'-sulfophenylazo)naphthalene-3,6-disulfonic acid,
8-amino-1-hydroxy-2-(2'-carboxyphenylazo)naphthalene-3,6-disulfonic acid,
8-amino-1-hydroxy-2,2'-azonaphthalene-1',3,6-trisulfonic acid,
8-amino-1-hydroxy-2,2'-azonaphthalene-1',3,5'-trisulfonic acid,
8-amino-1-hydroxy-2-(4'-hydroxy-3'-carboxyphenylazo)naphthalene-3,6-disulfonic acid,
1-hydroxy-2-(1'-sulfonaphth-2'-ylazo)-8-ω-(N-butylamino)propionylaminoaphthalene-3,6-disulfonic acid,
1-hydroxy-2-(1'-sulfonaphth-2'-ylazo)-8-ω-(N-methylamino)acetylaminonaphthalene-3,5-disulfonic acid,
1-hydroxy-2-(1'-sulfonaphth-2'-ylazo)-8-ω-(N-methylamino)acetylaminonaphthalene-3,6-disulfonic acid,
1-hydroxy-2-(2'-sulfophenylazo)-8-ω-(N-methylamino)acetylaminonaphthalene-3,6-disulfonic acid,
1-hydroxy-2-phenylazo-8-ω-(N-methylamino)acetylaminonaphthalene-3,6-disulfonic acid,
1 1-hydroxy-2-(4'-methoxy-2'-sulfophenylazo)-8-ω-(N-methylamino)-acetylaminonaphthalene-3,6-disulfonic acid,
1-hydroxy-2-(2'-sulfophenylazo)-8-ω-(N-methylamino)acetylaminonaphthalene-3,6-disulfonic acid,
1-hydroxy-2-(1'-sulfonaphth-2'-ylazo)-8-ω-aminoacetylaminonaphthalene-3,6-disulfonic acid,
1-hydroxy-2-(1'-sulfonaphth-2'-ylazo)-8-ω-aminopropylaminonaphthalene-3,6-disulfonic acid,
1-hydroxy-2-(1'-sulfonaphth-2'-ylazo)-8-ω-(N-propylamino)acetylamino-naphthalene-3,6-disulfonic acid,
1-hydroxy-2-(1'-sulfonaphth-2-ylazo)-8-ω-(N-butylamino)acetylaminonaphthalene-3,6-disulfonic acid,
1-hydroxy-2-(1'-sulfonaphth-2'-ylazo)-8-ω-(N-benzylamino)acetylaminonaphthalene-3,6-disulfonic acid,
8-amino-1-hydroxy-2-[4'-(2''-sulfophenylazo)-2'-methoxy-5'-methylphenylazo]naphthalene-3,6-disulfonic acid,
4,4'-bis(8''-amino-1''-hydroxy-3'',6''-disulfo-2''-naphthylazo)-3,3'-dimethoxydiphenyl,
6-amino-1-hydroxy-2-[4'-(2''-sulfophenylazo)-2'-methoxy-5'-methylphenylazo]naphthalene-3,5-disulfonic acid,
8-ω-(N-methylamino)acetylamino-1-hydroxy-2-[4'-(2''-sulfophenylazo)-2'-methoxy-5'-methylphenylazo]-naphthalene-3,6-disulfonic acid,
4,4-bis[8''-ω-(N-methylamino)acetylamino-1'''-hydroxy-3'',6''-disulfonaphth-2''-ylazo]-3,3'-dimethoxydiphenyl,
2-(4'-amino-2'-methylphenylazo)naphthalene-4,8-disulfonic acid,
2-(4'-amino-2'-acetylaminophenylazo)naphthalene-5,7-disulfonic acid,
2-(4'-amino-2'-ureidophenylazo)naphthalene-3,6,8-trisulfonic acid,
4-nitro-4'-(4''-methylaminophenylazo)stilbene-2,2'-disulfonic acid,
4-nitro-4'-(4''-amino-2''-methyl-5''-ω-methoxyphenylazo)stilbene-2,2'-disulfonic acid,
2-(4'-amino-2'-acetylaminophenylazo)naphthalene-4,8-disulfonic acid,
4-amino-2-methylazobenzene-2'-sulfonic acid,
4-[4'-(2'',5''-disulfophenylazo)-2',5'-dimethylphenylazo]-1-naphthylamine-8-sulfonic acid,
4-[4'-(2'',5'',7''-trisulfonaphth-1''-ylazo)-2',5'-dimethylphenylazo]-1-naphthylamine-6-sulfonic acid,
2-(4'-methylaminoacetylamino-2'-ureidophenylazo)-naphthalene-3,6,8-trisulfonic acid,
4-[4'-(2'',5'',7''-trisulfonaphth-1''-ylazo)-2',5'-dimethylphenylazo]-1-naphthylamine-7-sulfonic acid,
4-[4'-(2'',5'',7''-trisulfonaphth-1''-ylazo)naphth-1'-ylazo]-1-naphthylamine-6-sulfonic acid,
4-[4'-(2'',5''-disulfophenylazo)-6'-sulfonaphth-1'-ylazo]-1-naphthylamine-8-sulfonic acid,
4-[4'-(4''-sulfophenylazo)-2'-sulfophenylazo]-1-naphthylamine-6-sulfonic acid,
1-(2',5'-dichloro-4'-sulfophenyl)-3-methyl-4-(3''-amino-4''-sulfophenylazo)-5-pyrazolone,
1-(4'-sulfophenyl)-3-carboxy-4-(4''-amino-3''-sulfophenylazo)-5-pyrazolone,
1-(2'-methyl-5'-sulfophenyl)-3-methyl-4-(4''-amino-3''-sulfophenylazo)-5-pyrazolone,
1-(2'-sulfophenyl)-3-methyl-4-(3''-amino-4''-sulfophenylazo)-5-pyrazolone,
4-amino-4'-(3''-methyl-5''-oxo-1''-phenylpyrazolin-4''-ylazo)stilbene-2,2'-disulfonic acid,
4-amino-4'-(2''-hydroxy-3'',6-disulfo-1''-naphthylazo)-stilbene-2,2'-disulfonic acid,
8-acetylamino-1-hydroxy-2-(3'-amino-2'-sulfophenylazo)naphthalene-3,6-disulfonic acid,
7-phenylamino-1-hydroxy-2-(4'-amino-2'-carboxyphenyazo)naphthalene-3-sulfonic acid,
8-phenylamino-1-hydroxy-2-(4'-amino-2'-sulfophenylazo)naphthalene-3,6-disulfonic acid,
6-ureido-1-hydroxy-2-(5'-amino-2'-sulfophenylazo)-naphthalene-3-sulfonic acid,
6-acetylamino-1-hydroxy-2-(5'-amino-2'-sulfophenylazo)naphthalene-3-sulfonic acid,
8-benzoylamino-1-hydroxy-2-(5'-amino-2'-sulfophenylazo)naphthalene-3,6-disulfonic acid,
1-(4',8'-disulfonaphth-2'-yl)-3-methyl-4-(5''-amino-2''-sulfophenylazo)-5-pyrazolone,
1-(2'-sulfophenyl)-3-carboxy-4-(5''-amino-2''-sulfophenylazo)-5-pyrazolone,
1-(2',5'-dichloro-4'-sulfophenyl)-3-methyl-4-(5''-amino-2''-sulfophenylazo)-5-pyrazolone, 5-(3'-amino-4'-sulfophenylazo)-4-methyl-3-carbonamido-6-hydroxy-N-ethylpyrid-2-one,
5-(4'-amino-3'-sulfophenylazo)-4-methyl-3-cyano-6-hydroxy-N-ethylpyrid-2-one,
5-(4'-amino-2',5'-disulfophenylazo)-4-methyl-3-cyano-6-hydroxy-N-ethylpyrid-2-one,
5-(3'-amino-4'-sulfophenylazo)-3,4-dimethyl-6-hydroxy-1-n-propyl-pyrid-2-one,
5-(4'-amino-2',5'-disulfophenylazo)-1-n-butyl-6-hydroxy-4-methyl-3-sulfomethylpyrid-2-one,
5-(3'-amino-4'-sulfophenylazo)-1-ethyl-6-hydroxy-4-methyl-3-sulfopyrid-2-one,
5-(3'-amino-4'-sulfophenylazo)-3-chloro-1-ethyl-6-hydroxy-4-methylpyrid-2-one,
5-(3'-amino-4'-sulfophenylazo)-3-cyano-1-phenyl-6-hydroxy-4-sulfomethylpyrrolid-2-one,
5-(3'-amino-4'-sulfophenylazo)-3-aminocarbonyl-6-hydroxy-4-methyl-1-[2'-(4''-sulfophenyl)ethyl]pyrid-2-one,
1-hydroxy-2-[1'-sulfo-5'-aminomethylnaphth-2'-ylazo]-8-benzoylaminonaphthalene-3,6-disulfonic acid,
1-(2',5'-dichlorophenyl)-3-methyl-4-(1''-sulfo-5''-aminomethylnaphth-2''-ylazo)-5-pyrazolone,
1 1-phenyl-3-carboxy-4-(1''-sulfo-5''-aminomethylnaphth-2''-ylazo)-5-pyrazolone,
1-hydroxy-2-(1'-sulfo-5'-aminomethylnaphth-2'-ylazo)-8-benzoylaminonaphthalene-3,5-disulfonic acid,
1-hydroxy-2-(1'-sulfo-5'-aminomethylnaphth-2'-ylazo)-7-(2''-sulfophenylazo)-8-aminonaphthalene-3,6-disulfonic acid,
1-hydroxy-2-(1'-sulfo-5'-aminomethylnaphth-2'-ylazo)-7-(2'',5''-disulfophenylazo)-8-aminonaphthalene-3,6-disulfonic acid,
1-hydroxy-2-(1'-sulfo-5'-aminomethylnaphth-2'-ylazo)-8-acetylaminonaphthalene-3,5-disulfonic acid,
1-hydroxy-2-(4'-aminoacetylphenylazo)-6-acetylaminonaphthalene-3,5-disulfonic acid,
1-hydroxy-2-(2'-sulfo-5'-aminophenylazo)-7-(4''-sulfophenylazo)-8-aminonaphthalene-3,6-disulfonic acid,
5-(5'-aminoethyl-4'-methyl-2'-sulfophenylazo)-1-ethyl-6-hydroxy-4-methyl-3-sulfopyrid-2-one,
1-hydroxy-2-(5'-aminomethyl-4'-methyl-2'-sulfophenylazo)-7-(1'',5''-disulfonaphth-2''-ylazo)-8-aminonaphthalene-3,6-disulfonic acid,
1-hydroxy-2-[4'-(4''-aminomethyl-2''-sulfophenylazo)-2'-methoxyphenylazo]naphthalene-3,6,8-trisulfonic acid,
1-(4'-sulfophenyl)-3-carboxy-4-(4'''-methylaminoacetylamino-2''-sulfophenylazo)-5-pyrazolone,
1-(3'-methylaminoacetylaminophenyl)-3-carboxy-4-(1'',5''-disulfonaphth-2''-ylazo)-5-pyrazolone,
1-hydroxy-2-(1'-sulfo-5'-β-aminoethylsulfamoylnaphth-2'-ylazo)-8-benzoylamino-3,6-disulfonic acid,
1-hydroxy-2-(1'-sulfo-5'-β-aminoethylsulfamoylnaphth-2'-ylazo)-8-acetylamino-3,5-disulfonic acid,
1-(3'-aminophenyl)-3-methyl-4-(2',5'-disulfonylazo)-5-pyrazolone,
1-(3'-aminophenyl)-3-carboxy-4-(2'-carboxyphenylazo)-5-pyrazolone,
1-(3'-aminoacetylaminophenyl)-3-methyl-4-(2'-sulfophenylazo)-5-pyrazolone,
4-amino-4'-[3''-methyl-4''-(2'',5''''-disulfophenylazo)-1''-pyrazol-5''-onyl]stilbene-2,2'-disulfonic acid,
1-(3'-aminophenyl)-3-carboxy-4-[4''-(2'''-sulfophenylazo)-2''-methoxy-5''-methylphenylazo]-5-pyrazolone,
1-(2'-aminoethyl)-3-(1'',5''-disulfonaphth-2''-ylazo)-6-hydroxy-4-methyl-pyrid-2-one,
1-(2'-aminoethyl)-3,4-dimethyl-5-(1'',5''-disulfonaphth-2-ylazo)-6-hydroxypyrid-2-one,
3-aminocarbonyl-1-(2'-aminoethyl)-6-hydroxy-4-methyl-5-(1'',5''-disulfonaphth-2''-ylazo)-pyrid-2-one,
1-(2'-aminoethyl)-3-cyano-5-(2''-sulfophenylazo)-6-hydroxy-4-methylpyrid-2-one,
3-(3'-amino-4'-sulfophenyl)sulfamyl copper phthalocyanine-tri-3-sulfonic acid,
4-(3'-amino-4'-sulfophenyl)sulfamyl copper phthalocyanine-tri-4-sulfonic acid,
3-(3'- or 4'-aminophenyl)sulfamyl copper phthalocyanine-3-sulfonamide-di-3-sulfonic acid,
3-(2-aminoethyl)sulfamyl copper phthalocyanine-tri-3-sulfonic acid,
copper complex of N-(2-hydroxy-5-sulfo-3-aminophenyl)-N'-(2'-carboxy-5'-sulfophenyl)-ms-phenylformazan,
copper complex of N-(2-hydroxy-5-sulfo-3-aminophenyl)-N'-(2'-carboxy-4'-sulfophenyl)-ms-phenylformazan,
copper complex of N-(2-hydroxy-5-sulfophenyl)-N-(2'-carboxy-4'-aminophenyl)-ms-(2''-sulfophenyl)formazan,
copper complex of N-(2-hydroxy-5-sulfophenyl)-N'-(2'-carboxy-4'-aminophenyl)-ms-(2''-chloro-5''-sulfophenyl)formazan,
copper complex of N-(2-hydroxy-5-sulfophenyl)-N'-(2'-carboxy-4'-sulfophenyl)-ms-(4-aminophenyl)formazan,
copper complex of N-(2-hydroxy-5-sulfophenyl)-N'-(2'-carboxy-4'-sulfophenyl)-ms-(4''-amino-2''-sulfophenyl)formazan,
copper complex of N-(2-carboxy-4-aminophenyl)-N'-(2'- hydroxy-4'-sulfonaphth-1-yl)-ms-(2''-sulfophenyl)formazan, and
copper complex of N-(2-hydroxy-5-sulfophenyl)-N-(2'-carboxy-4'-sulfophenyl)-ms-(4''-aminoacetylaminophenyl)formazan.

When Y of general formula (I) is represented by formula (1), the alkylene represented by W is preferably methylene, ethylene, methylmethylene, propylene or butylene, among which ethylene and propylene are particularly preferable.

When Y of general formula (I) is represented by formula (2), a case that n and m independently of each other are 2, 3 or 4 is preferable, and a case that n and m are 2 is particularly preferable.

When Y of general formula (I) is represented by formula (3), examples of $R_4$ include hydrogen, methyl, ethyl, propyl, isopropyl, butyl, isobutyl, sec-butyl, tert-butyl, pentyl, hexyl and the like, among which hydrogen is preferable; and the alkylene represented by $W_1$ and $W_2$ is preferably ethylene, propylene or butylene.

Examples of the group capable of being split by the action of alkali represented by Z' include sulfuric acid ester, thiosulfuric acid ester, phosphoric acid ester, acetic acid ester, halogeno and the like, among which sulfuric acid ester and chloro are particularly preferable.

R of general formula (I) is preferably hydrogen or methyl.

In general formula (I), the phenylene and naphthylene represented by A are, for example, a phenylene group unsubstituted or substituted once or twice by a substituent selected from the group consisting of methyl, ethyl, methoxy, ethoxy, chloro, bromo, carboxy and sulfo or a naphthylene group unsubstituted or substituted by sulfo. Examples of such A include the followings:

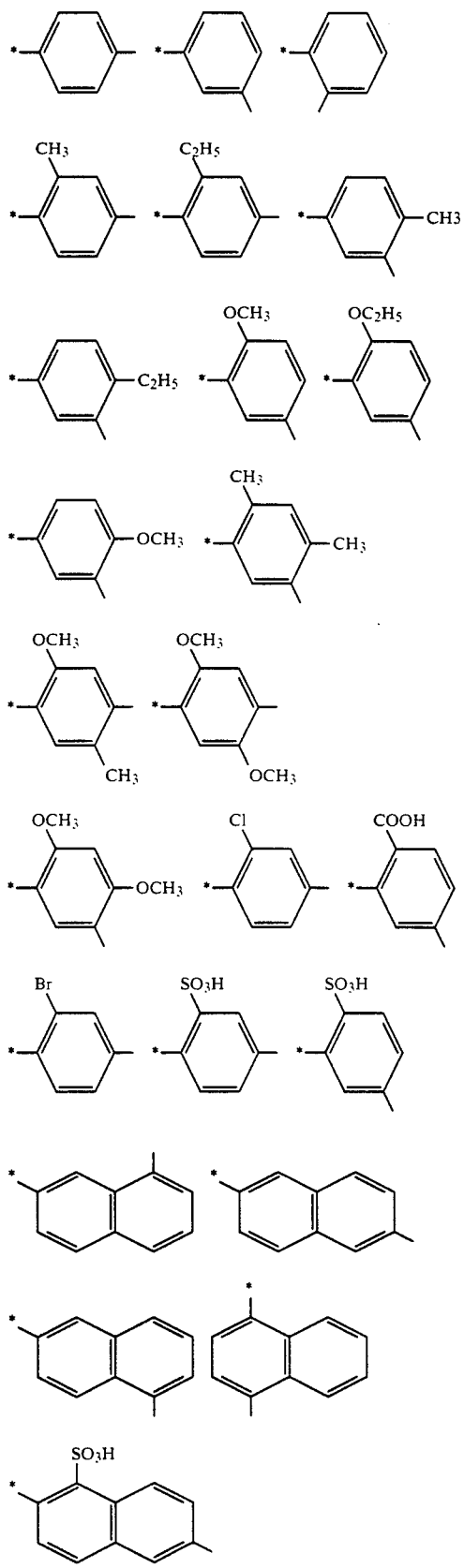

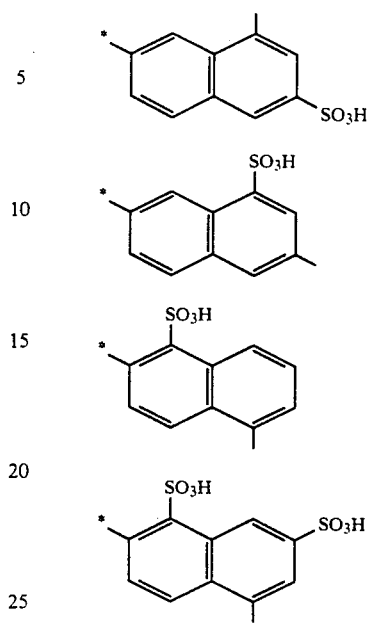

wherein the mark * means a bond linking to

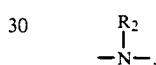

Among them, particularly preferable examples of A are phenylene groups unsubstituted or substituted once or twice by a substituent selected from the group consisting of methyl, methoxy, chloro, carboxy and sulfo and naphthylene groups unsubstituted or substituted by one sulfo group.

As the alkyl unsubstituted or substituted by a substituent represented by $R_2$, $C_1$-$C_4$ alkyl is preferable. As the substituent, hydroxy, cyano, alkoxy, halogeno, carbamoyl, carboxy, alkoxycarbonyl, alkylcarbonyloxy, sulfo and sulfamoyl are preferable.

As $R_2$, hydrogen, methyl and ethyl are particularly preferable.

The compounds of the present invention exist in the form of a free acid or a salt thereof. As the salt, alkali metal salts and alkaline earth metal salts are preferable, and sodium salt, potassium salt and lithium salt are particularly preferable.

The compounds of the present invention can be produced, for example, in the following manner. Thus, the compounds of general formula (I) can be obtained by subjecting a compound represented by the following general formula (II):

wherein F and R are as defined above, and compounds represented by the following general formulas (III) and (IV):

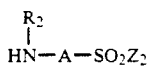

$$\begin{matrix} R_2 \\ | \\ HN-A-SO_2Z_2 \end{matrix} \quad (IV)$$

wherein $R_1$, $R_2$, Y, A, $Z_1$ and $Z_2$ are as defined above, to a condensation reaction with 2,4,6-trihalogeno-s-triazine in an optional order.

If desired, the compounds of the present invention represented by formula (I) wherein Z' is $OSO_3H$ can be obtained by subjecting a compound represented by general formula (II) and compounds represented by the following general formulas (V) and (VI):

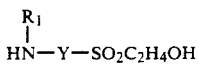

$$\begin{matrix} R_1 \\ | \\ HN-Y-SO_2C_2H_4OH \end{matrix} \quad (V)$$

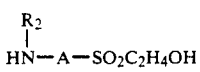

$$\begin{matrix} R_2 \\ | \\ HN-A-SO_2C_2H_4OH \end{matrix} \quad (VI)$$

wherein $R_1$, $R_2$, Y and A are as defined above, to a condensation reaction with 2,4,6-trihalogeno-s-triazine in an optional order, followed by treating the product with sulfuric acid or fuming sulfuric acid to form $OSO_3H$ as Z'.

In this method, the order of the condensation reaction is not critical. If the yield of the compound of general formula (I) and its quality are taken into consideration, however, it is preferable to react the cyanuric halide with a compound of lower reactivity earlier than a compound of higher reactivity.

Although conditions of the reaction are not particularly critical, the reaction is made to progress while controlling the conditions so that the temperature and pH value come to $-10°$ C. to 40° C. at pH 2-9 primarily, 0° C. to 70° C. at pH 2-9 secondarily and 10° C. to 100° C. at pH 2-9 tertiarily, whereby a compound represented by general formula (I) or its salt can be obtained.

As the starting 2,4,6-trihalaogeno-s-triazine, cyanuric chloride and cyanuric fluoride are particularly preferable.

Examples of the amine represented by formula (III) include the followings:

β-(β-chloroethylsulfonyl)ethylamine,
β-vinylsulfonylethylamine,
γ-(β-chloroethylsulfonyl)propylamine,
bis[β-(β-chloroethyl)sulfonylethyl]amine,
bis(β-vinylsulfonyl)ethylamine,
β-[β-(β-chloroethylsulfonyl)ethoxy]ethylamine,
β-(β-vinylsulfonylethoxy)ethylamine,
bis[β-(β-vinylsulfonylethoxy)ethyl]amine,
β-[β-(β-chloroethylsulfonyl)ethylamino]ethylamine,
β-(β-vinylsulfonylethylamino)ethylamine,
(β-sulfatoethylsulfonyl)ethylamine,
γ-(β-sulfatoethylsulfonyl)propylamine,
bis[β-(β-sulfatoethylsulfonyl)ethyl]amine,
β-[β-(β-sulfatoethylsulfonyl)ethoxy]ethylamine,
β-[β-(β-sulfatoethylsulfonyl)ethylamino]ethylamine,
and the like.

The compounds of the present invention have a fiber-reactive group and can be used for dyeing or printing hydroxy group- or carbonamide group-containing materials. Preferably, the material to be dyed or printed is used in the form of a fiber material or a mixed woven material thereof.

Said hydroxy group-containing material includes natural and synthetic hydroxy group-containing materials such as cellulose fiber materials, their regenerated products and polyvinyl alcohol. As the cellulose fiber material, cotton and other plant fibers such as linen, flax, jute and ramie fibers are preferable. As the regenerated cellulose fiber, viscose staple and filament viscose can be referred to.

Said carbonamide group-containing material includes synthetic and natural polyamides and polyurethanes. Particularly in the form of a fiber, it includes wool and other animal furs, silk, leather, polyamide-6,6, polyamide-6, polyamide-11 and polyamide-4.

The compounds of the present invention can be used for dyeing or printing said materials, particularly those such as fiber materials, in a manner depending on physical and chemical properties of the material. The manner includes, for example, exhaustion dyeing, padding and printing methods.

For example, the exhaustion dyeing method can be carried out at a relatively low temperature in the presence of an acid binding agent such as sodium carbonate, sodium tertiary phosphate, sodium hydroxide and the like and, if desired, a neutral salt such as sodium sulfate optionally together with dissolving assistants, penetrants or level dyeing agents. The neutral salt which can be used for promoting the exaustion of the dye may be added either after the intended dyeing temperature has been reached or before it, optionally in portions.

The padding method can be carried out by padding the materials at room or elevated temperature, followed by drying and then steaming or dry-heating the padded materials to perform dye fixation.

The printing method can be carried out in a one-phase or two-phase manner on the cellulose fiber material. The one-phase printing may be conducted by printing the fiber materials with a printing paste containing an acid-binding agent such as sodium bicarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate or starch ether is used optionally together with a conventional printing assistant such as urea and/or a dispersing agent.

As examples of the acid binding agent suitable for fixing the compound of the present invention onto cellulose fiber, water-soluble basic salts formed between an alkali metal or an alkaline earth metal and an inorganic or organic acid or a compound liberating alkali in a heated state can be referred to. Particularly, alkali metal salts formed between an alkali metal hydroxide and an inorganic or organic acid of weak or medium strength are preferable, among which sodium salts and potassium salts are most preferable. Examples of such acid binding agent include sodium hydroxide, potassium hydroxide, sodium bicarbonate, sodium carbonate, sodium formate, potassium carbonate, sodium primary, secondary and tertirary phsophates, sodium silicate, sodium trichloroacetate and the like.

The dyeing of synthetic and natural polyamide and polyurethane fibers can be carried out by performing exhaution in an acid or weak acid bath at a controlled pH value and then making the bath neutral or in some cases alkaline to perform fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is particularly useful for dyeing cellulose fiber materials, and gives a dyed product excellent in light fastness, perspiration-light fastness, wet fastnesses such as washing resistance, chlorine resistance, peroxide-washing resistance, perspiration resistance, acid hydrolysis resistance and alkali resistance, and abrasion fastness and iron fastness.

It is further characterized by excellency in build-up, level-dyeing and wash-off properties and high solubility as well as high exhaustion and fixation percentages. Moreover, it is characterized in that it is hardly affected by changes in dyeing temperature and dyeing bath ratio, so that a dyed product with a stable quality can be obtained.

Moreover, the compound of the present invention is characterized in that it is resistance to color change at the time of fixing treatment and resin treatment of dyed product and resistant to the change due to contact with basic substances during storage.

The present invention will be illustrated in more detail by way of the following examples, wherein parts and % are by weight.

EXAMPLE 1

Cyanuric chloride (18.5 parts) was subjected to a condensation reaction with 1-amino-8-naphthol-3,6-disulfonic acid (31.9 parts) and $\beta$-($\beta$-chloroethylsulfonyl)-ethylamine (17.2 parts) in the conventional manner to obtain a compound represented by the following formula in the free acid form:

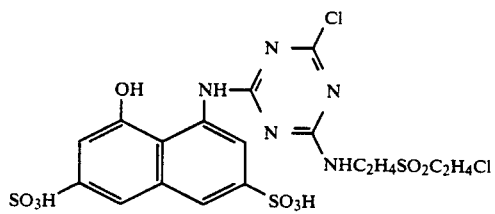

On the other hand, 2-aminonaphthalene-1,5-disulfonic acid (30.3 parts) was diazotized in the usual way and coupled with the compound represented by the above-mentioned formula, after which the coupled product was subjected to a condensation reaction with 1-aminobenzene-3-$\beta$-sulfatoethylsulfone (28.1 parts) to obtain a triazine compound represented by the following formula in the free acid form:

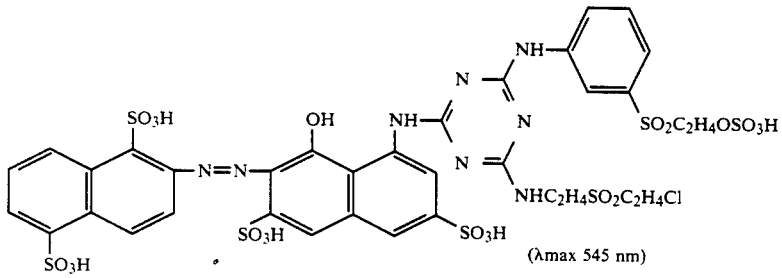

($\lambda$max 545 nm)

EXAMPLE 2

Example 1 can be repeated, except that the 2-aminonaphthalene-1,5-disulfonic acid, 1-amino-8-naphthol-3,6-disulfonic acid, $\beta$-($\beta$-chloroethylsulfonyl)ethylamine and 1-aminobenzene-3-$\beta$-sulfatoethylsulfone used in Example 1 are replaced with the compounds of Columns 2, 3, 4 and 5 of the following table, respectively, to obtain the corresponding compounds. When used for dyeing, these compounds give dyed products of which hues are as shown in Column 6 of the table.

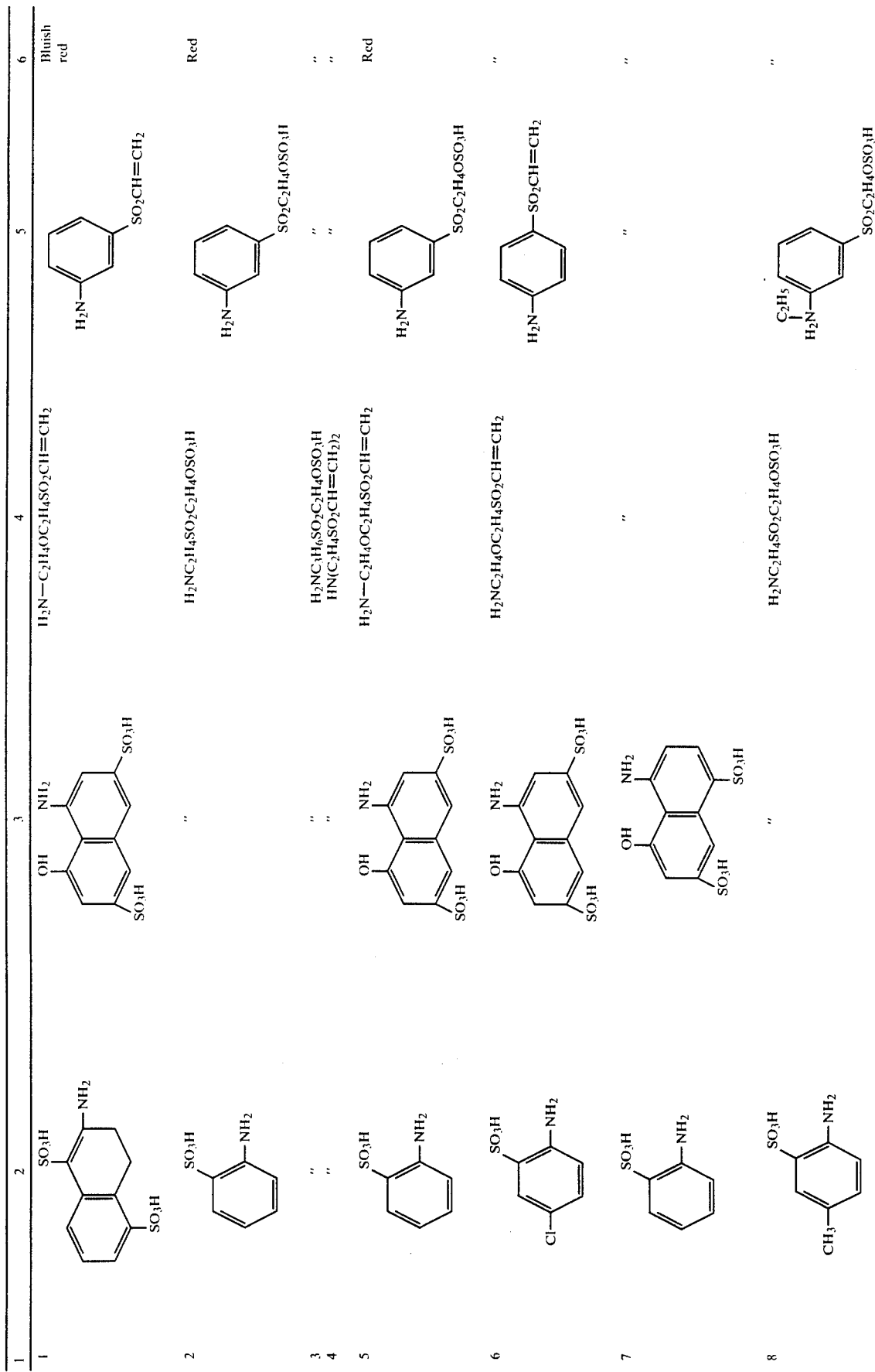

| 1 | 2 | 3 | 4 | 5 | 6 |
|---|---|---|---|---|---|
| 9 | 2-aminobenzenesulfonic acid | 8-amino-1-hydroxynaphthalene-3,6-disulfonic acid | H₂NH₂H₄SO₂C₂H₄OSO₃H | 6-amino-2-(β-sulfatoethylsulfonyl)naphthalene | Red |
| 10 | " | " | HN(C₂H₄SO₂C₂H₄Cl)₂ | 3-aminophenyl-β-sulfatoethylsulfone | " |
| 11 | 2-amino-4-methoxybenzenesulfonic acid | 4-amino-5-hydroxynaphthalene-2,7-disulfonic acid | H₂NH₂H₄SO₂C₂H₄Cl | 4-amino-2-methoxyphenyl-β-sulfatoethylsulfone | Red |
| 12 | 2-amino-naphthalene-1,5-disulfonic acid | 8-amino-1-hydroxynaphthalene-3,6-disulfonic acid | H₂NC₂H₄OC₂H₄SO₂CH=CH₂ | 7-amino-3-(β-sulfatoethylsulfonyl)naphthalene with 8-SO₃H | Bluish red |
| 13 | 2-amino-naphthalene-1,5-disulfonic acid | 8-amino-1-hydroxynaphthalene-3,6-disulfonic acid | HN(C₂H₄SO₂CH=CH₂)₂ | 4-amino-3-methoxyphenyl-(β-sulfatoethylsulfonyl) | Bluish red |
| 14 | " | " | H₂NC₃H₆SO₂CH=CH₂ | 6-amino-2-(vinylsulfonyl)naphthalene | Bluish red |

-continued
| 1 | 2 | 3 | 4 | 5 | 6 |
|---|---|---|---|---|---|
| 15 | 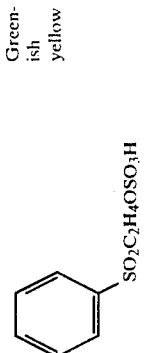 | " | H₂NC₃H₆SO₂C₂H₄Cl |  | Bluish red |
| 16 |  |  | H₂NH₂H₄OC₂H₄SO₂CH=CH₂ |  | Greenish yellow |
| 17 |  |  | HN(C₂H₄SO₂C₂H₄Cl)₂ |  | Greenish yellow |
| 18 | " | " | H₂NC₃H₆SO₂C₂H₄SO₃H | " | Greenish yellow |
| 19 | " | " | H₂NC₂H₄OC₂H₄SO₂C₂H₄Cl | " | Greenish yellow |
| 20 |  | " | HN(C₂H₄SO₂CH=CH₂)₂ |  | " |

-continued

| 1 | 2 | 3 | 4 | 5 | 6 |
|---|---|---|---|---|---|
| 21 | 3-amino-naphthalene-1,5-disulfonic acid (NH₂, SO₃H, SO₃H) | 4-aminophenyl azo acetylacetone (OH, CH₃) | H₂NC₂H₄SO₂CH=CH₂ | 2-amino-5-(vinylsulfonyl)benzoic acid (H₂N, COOH, SO₂CH=CH₂) | Greenish yellow |
| 22 | " | 3-aminophenyl azo acetylacetone (OH, CH₃) | HN(C₂H₄SO₂C₂H₄Cl)₂ | 6-amino-2-(2-sulfatoethylsulfonyl)naphthalene (H₂N, SO₂C₂H₄OSO₃H) | Greenish yellow |
| 23 | 2-amino-naphthalene-1,5-disulfonic acid (SO₃H, NH₂, SO₃H) | 3-aminophenyl azo (OH, COOH) | " | 4-amino-2,5-dimethoxyphenyl vinylsulfone (OCH₃, H₂N, OCH₃, SO₂CH=CH₂) | Greenish yellow |
| 24 | " | 1-(2-aminoethyl)-3-methyl-6-hydroxy-pyridone (CH₃, O, N-C₂H₄NH₂, HO) | HN(C₂H₄SO₂CH=CH₂)₂ | 3-amino-(2-sulfatoethylsulfonyl)benzene (H₂N, SO₂C₂H₄OSO₃H) | " |
| 25 | 2-aminobenzene sulfonic acid (SO₃H, NH₂) | 1-(2-aminoethyl)-3-carbamoyl-4-methyl-6-hydroxy-pyridone (CH₃, CONH₂, O, N-C₂H₄NH₂, HO) | H₂NC₂H₄NHC₂H₄SO₂CH=CH₂ | 3-amino-(2-sulfatoethylsulfonyl)benzene (H₂N, SO₂C₂H₄OSO₃H) | Greenish yellow |

| 1 | 2 | 3 | 4 | 5 | 6 |
|---|---|---|---|---|---|
| 26 | [naphthalene with NH2, SO3H, SO3H] | [naphthalene-azo-benzene with OH, NH2, NH2, SO3H groups] | H2NC2H4OC2H4SO2CH=CH2 | " | Greenish blue |
| 27 | " | " | HN(C2H4SO2C2H4Cl)2 | " | Greenish blue |
| 28 | [naphthalene with SO3H, NH2] [benzene with SO3H, NH2, CH3] | " | H2NC3H6SO2C2H4OSO3H | " | Greenish blue |
| 29 | | [naphthalene-azo-benzene with OH, NH2, NH2, SO3H groups] | H2NC2H4SO2C2H4OSO3H | [aniline with SO2C2H4OSO3H] | Greenish blue |
| 30 | [substituted benzene-azo-naphthalene with OCH3, NH2, CH3, SO3H] | [naphthalene with NH2, OH, SO3H] | HN(C2H4SO2C2H4Cl)2 | " | Greenish blue |
| 31 | [naphthalene with SO3H, NH2, SO3H] | [naphthalene-azo-benzene with OH, NH2, SO3H, NH2 groups] | H2NC2H4OC2H4SO2CH=CH2 | [aniline with SO2CH=CH2] | Greenish blue |
| 32 | " | " | HN(C2H4SO2C2H4Cl)2 | [aniline with SO2C2H4OSO3H] | Greenish blue |

-continued

| 1 | 2 | 3 | 4 | 5 | 6 |
|---|---|---|---|---|---|
| 33 | 2-amino-1-naphthalenesulfonic acid structure | diazo-coupled naphthalene with NH₂, OH, SO₃H groups | HN(C₂H₄SO₂C₂H₄Cl)₂ | 4-amino-phenyl-SO₂C₂H₄OSO₃H | Greenish blue |
| 34 | OCH₃, NH₂, CH₃ substituted phenyl azo naphthalene disulfonic acid | 4-amino-5-hydroxy-naphthalene sulfonic acid | | 2-methoxy-5-(SO₂C₂H₄OSO₃H)-aniline | Greenish blue |
| 35 | OCH₃, CH₃ substituted phenyl azo naphthalene disulfonic acid | OC₂H₅, NH₂, CH₃ substituted phenyl | H₂NC₂H₄OC₂H₄SO₂CH=CH₂ | 3-(ethylamino)phenyl-SO₂C₂H₄OSO₃H | Greenish blue |
| 36 | 2-amino-naphthalene-1,5-disulfonic acid | 4-amino-5-hydroxy-naphthalene-2,7-disulfonic acid | H₂NC₂H₄SO₂C₂H₄OSO₃H | 3-amino-phenyl-SO₂C₂H₄OSO₃H | Bluish red |
| 37 | 2-amino-naphthalene-1,5-disulfonic acid | 4-amino-5-hydroxy-naphthalene-2,7-disulfonic acid | H₂NC₂H₄SO₂C₂H₄OSO₃H | 4-amino-phenyl-SO₂C₂H₄OSO₃H | Bluish red |

-continued

| 1 | 2 | 3 | 4 | 5 | 6 |
|---|---|---|---|---|---|
| 38 | 2-amino-1-naphthalenesulfonic acid (NH₂ at 2, SO₃H at 1) | " | " | 3-amino-benzene with SO₂C₂H₄OSO₃H (H₂N-C₆H₄-SO₂C₂H₄OSO₃H) | Bluish red |
| 39 | " | 1-amino-8-hydroxy-naphthalene-3,6-disulfonic acid (NH₂, OH, SO₃H, SO₃H) | H₂NC₂H₄OC₂H₄SO₂CH=CH₂ | | Bluish red |
| 40 | " | " | HN(C₂H₄SO₂C₂H₄Cl)₂ | | Bluish red |
| 41 | " | " | " | 3-amino-benzene with SO₂C₂H₄OSO₃H | Bluish red |
| 42 | 2-amino-1-naphthalenesulfonic acid | " | H₂NC₃H₆SO₂C₂H₄OSO₃H | " | Bluish red |
| 43 | " | " | " | 3-(N-ethylamino)-benzene with SO₂C₂H₄OSO₃H | Bluish red |
| 44 | 3-amino-naphthalene-2,5,7-trisulfonic acid (NH₂, SO₃H, SO₃H, SO₃H) | substituted benzene: NH₂, SO₃H, COCH₃–CH₂–CONH, OCH₃ | " | | Greenish yellow |

-continued

| 1 | 2 | 3 | 4 | 5 | 6 |
|---|---|---|---|---|---|
| 45 | naphthalene with NH₂, SO₃H, SO₃H, SO₃H substituents | benzene with COCH₃, OCH₃, NH₂, SO₃H, —CH₂—CONH substituents | H₂NC₂H₄SO₂C₂H₄OSO₃H | benzene with H₂N and SO₂C₂H₄OSO₃H | Greenish yellow |
| 46 | naphthalene with SO₃H, NH₂, SO₃H substituents | naphthalene-azo-benzene with SO₃H, NH₂, OH, SO₃H, NH₂, SO₃H substituents | H₂NC₂H₄SO₂CH=CH₂ | benzene with H₂N and SO₂C₂H₄OSO₃H | Greenish blue |
| 47 | " | " | H₂NC₂H₄SO₂C₂H₄OSO₃H | benzene with C₂H₅HN and SO₂C₂H₄OSO₃H | Greenish blue |
| 48 | naphthalene with SO₃H, NH₂ substituents | naphthalene-azo-benzene with SO₃H, NH₂, OH, SO₃H, NH₂, SO₃H substituents | " | " | Greenish blue |
| 49 | naphthalene with SO₃H, NH₂ substituents | " | H₂NC₂H₄SO₂C₂H₄OSO₃H | benzene with H₂N and SO₂C₂H₄OSO₃H | Greenish blue |
| 50 | benzene with SO₃H, NH₂ substituents | " | " | " | Greenish blue |

| 1 | 2 | 3 | 4 | 5 | 6 |
|---|---|---|---|---|---|
| 51 | naphthalene with SO₃H, NH₂, SO₃H substituents | naphthalene with OH, NH₂, SO₃H, SO₃H substituents azo-linked to phenyl with SO₃H, NH₂ | | | Greenish blue |
| 52 | naphthalene with SO₃H, NH₂, SO₃H substituents | naphthalene with OH, NH₂, SO₃H, SO₃H substituents azo-linked to phenyl with SO₃H, NH₂, SO₃H | H₂NC₂H₄OC₂H₄SO₂CH=CH₂ | " | Greenish blue |
| 53 | naphthalene with SO₃H, NH₂, SO₃H substituents | naphthalene with OH, NH₂, SO₃H, SO₃H substituents azo-linked to phenyl with SO₃H, NH₂, SO₃H | | phenyl with H₂N and SO₂C₂H₄OSO₃H | Greenish blue |
| 54 | naphthalene with SO₃H, NH₂, SO₃H substituents | naphthalene with OH, NH₂, SO₃H, SO₃H substituents azo-linked to phenyl with SO₃H, NH₂, OCH₃ | H₂NC₃H₆SO₂C₂H₄Cl | " | Greenish blue |
| 55 | " | naphthalene with OH, NH₂, SO₃H, SO₃H substituents azo-linked to phenyl with SO₃H, NH₂, CH₃ | | " | Greenish blue |

EXAMPLE 3

Each of the triazine compounds obtained in Examples 1 and 2 (0.1, 0.3 and 0.6 part portions of every compound) was dissolved into water (200 parts). After adding sodium sulfate (10 parts) and cotton (10 parts), the temperature was elevated to 60° C., sodium carbonate (4 parts) was added, and dyeing was carried out for one hour. The dyed cotton was washed with water, soaped, again washed with water and dried to obtain a dyed product. The dyed products thus obtained were excellent in fastnesses and good in build-up property, and their hues were as shown in Column 6 of the table.

EXAMPLE 4

Using each of the triazine compounds obtained in Examples 1 and 2, color pastes having the following composition were prepared:

| | |
|---|---|
| Compound | 5 parts |
| Urea | 5 parts |
| Sodium alginate (5%) stock paste | 50 parts |
| Hot water | 25 parts |
| Sodium bicarbonate | 2 parts |
| Balance | 13 parts. |

A mercerized cotton broad cloth was printed with each color paste. After intermediate drying, it was steamed at 100° C. for 5 minutes, washed with hot water, soaped, again washed with hot water and dried. The printed products thus obtained were excellent in fastnesses, and their hues were as shown in Column 6 of the table.

EXAMPLE 5

In an aqueous medium, a copper formazan compound (59.5 parts) represented by the following formula in the free acid form:

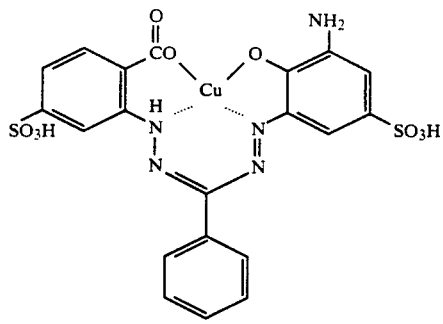

was subjected to a condensation reaction with cyanuric chloride (18.4 parts) and then with β-(β-chloroethylsulfonyl)ethylamine (17.2 parts) in the usual manner, after which it was subjected to a further condensation reaction with 1-aminobenzene-3-β-sulfatoethylsulfone (28.1 parts). Thus, a triazine compound represented by the following formula in the free acid form was obtained:

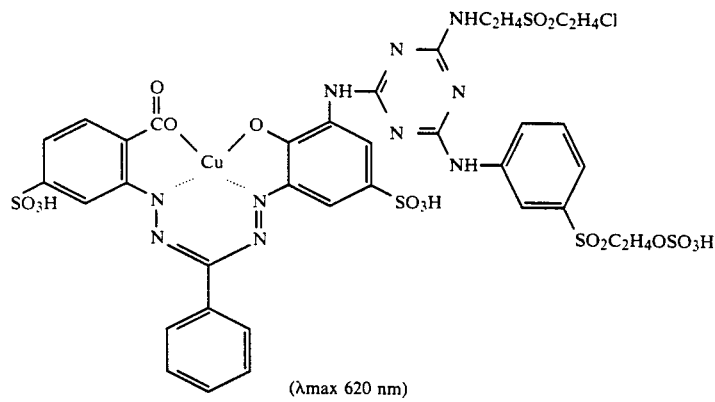

(λmax 620 nm)

EXAMPLE 6

Example 3 can be repeated, except that the copper formazan compound, β-(β-chloroethylsulfonyl)ethylamine and 1-aminobenzene-3-β-sulfatoethylsulfone used in Example 5 are replaced with the compounds of Column 2, 3 and 4 of the following table, respectively, to obtain the corresponding compounds. When used for dyeing, these compounds give dyed products of which hues are as shown in Column 5 of the table.

| 1 | 2 | 3 | 4 | 5 |
|---|---|---|---|---|
| 1 | ![structure: Cu complex with benzoate, azo, hydrazone, phenyl, two SO3H, NH2, O groups] | $H_2NC_2H_4OC_2H_4SO_2CH=CH_2$ | ![structure: m-aminophenyl-SO2C2H4OSO3H] | Blue |
| 2 | '' | $HN(C_2H_4SO_2C_2H_4Cl)_2$ | '' | '' |
| 3 | '' | $H_2NC_2H_4SO_2C_2H_4OSO_3H$ | '' | '' |
| 4 | ![structure: similar Cu complex with SO3H positions varied] | '' | '' | '' |
| 5 | ![structure: Cu complex variant] | $HN(C_2H_4SO_2CH=CH_2)_2$ | ![structure: m-aminophenyl-SO2C2H4OSO3H] | Blue |
| 6 | ![structure: anthraquinone with NH2, SO3H, NH-phenyl(SO3H, NH2)] | $H_2NC_2H_4OC_2H_4SO_2CH=CH_2$ | '' | Brilliant blue |
| 7 | '' | $HN(C_2H_4SO_2C_2H_4Cl)_2$ | '' | Brilliant blue |
| 8 | ![structure: anthraquinone with NH2, SO3H, NH-(trimethyl aminophenyl SO3H)] | $H_2NC_2H_4SO_2C_2H_4OSO_3H$ | ![structure: p-aminophenyl-SO2C2H4OSO3H] | Brilliant blue |

| 1 | 2 | 3 | 4 | 5 |
|---|---|---|---|---|
| 9 | " | $H_2NC_2H_4OC_2H_4SO_2CH=CH_2$ | $H_2N-\!\!\bigcirc\!\!-SO_2C_2H_4OSO_3H$ (meta) | Brilliant blue |
| 10 | 1-amino-4-(4-amino-3-sulfophenylamino)anthraquinone-2-sulfonic acid structure | $H_2NC_2H_4SO_2CH=CH_2$ | " | Brilliant blue |
| 11 | Cu-complex azo structure (benzoyl hydrazone) with two $SO_3H$ groups | $H_2NC_2H_4SO_2C_2H_4OSO_3H$ | $C_2H_5\text{-}HN\!\!-\!\!\bigcirc\!\!-SO_2C_2H_4OSO_3H$ (para) | Blue |
| 12 | " | $H_2NC_2H_4OC_2H_4SO_2CH=CH_2$ | " | " |
| 13 | " | $H_2NC_3H_6SO_2C_2H_4OSO_3H$ | $C_2H_5\text{-}HN\!\!-\!\!\bigcirc\!\!-SO_2C_2H_4OSO_3H$ (meta) | " |
| 14 | 1-amino-4-(4-aminocyclohexylamino)anthraquinone-2-sulfonic acid structure | $H_2NC_2H_4SO_2C_2H_4OSO_3H$ | $C_2H_5\text{-}HN\!\!-\!\!\bigcirc\!\!-SO_2C_2H_4OSO_3H$ (meta) | Brilliant blue |
| 15 | 1-amino-4-(2-aminoethylamino)-6(or 7)-sulfoanthraquinone-2-sulfonic acid structure ($NHC_2H_4NH_2$) | " | $H_2N-\!\!\bigcirc\!\!-SO_2C_2H_4OSO_3H$ (meta) | Blue |

EXAMPLE 7

Each of the triazine compounds obtained in Examples 5 and 6 (0.1, 0.3 and 0.6 part portions of every compound) was dissolved into water (200 parts). After adding sodium sulfate (10 parts) and cotton (10 parts), the temperature was elevated to 60° C., sodium carbonate (4 parts) was added, and dyeing was carried out for one hour. The dyed cotton thus obtained was washed with water, soaped, again washed with water and dried to obtain a dyed product. The dyed products thus obtained were blue-colored, excellent in fastnesses and good in build-up property.

EXAMPLE 8

Using each of the triazine compounds obtained in Examples 5 and 6, color pastes having the following composition were prepared:

| | |
|---|---|
| Compound | 5 parts |
| Urea | 5 parts |
| Sodium alginate (5%) stock paste | 50 parts |

| | |
|---|---|
| Hot water | 25 parts |
| Sodium bicarbonate | 2 parts |
| Balance | 13 parts. |

A mercerized cotton broad cloth was printed with each color paste. After intermediate drying, it was steamed at 100° C. for 5 minutes, washed with hot water, soaped, again washed with hot water and dried. Thus, there was obtained a blue-colored printed product excellent in fastnesses.

EXAMPLE 9

Cyanuric chloride (184.5 parts), 2,4-diaminobenzenesulfonic acid (188 parts) and β-(β-chloroethylsulfonyl)ethylamine (172 parts) were subjected to a condensation reaction in the usual manner to obtain a compound represented by the following formula in the free acid form:

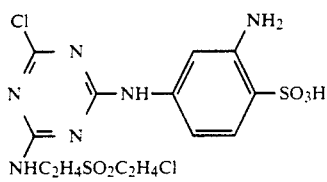

This compound was diazotized in the usual manner, coupled with 1-(3'-sulfophenyl)-3-methylpyrazolone-5 (254 parts) and then subjected to a condensation reaction with 1-aminobenzene-3-β-sulfatoethylsulfone (281 parts). The compound thus obtained was salted out with sodium chloride and isolated to obtain a triazine compound represented by the following formula in the free acid form:

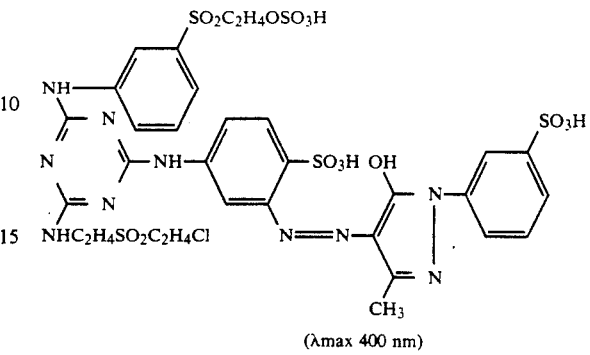

(λmax 400 nm)

EXAMPLE 10

Example 9 can be repeated, except that the 2,4-diaminobenzenesulfonic acid, β-(β-chloroethylsulfonyl)ethylamine, 1-(3'-sulfophenyl)-3-methylpyrazolone-5 and 1-aminobenzene-3-β-sulfatoethylsulfone used in Example 9 are replaced with the compounds of Columns 2, 3, 4 and 5 of the following table, respectively, to obtain the corresponding triazine compounds. When used for dyeing, these compounds give dyed products of which hues are as shown in Column 6 of the table.

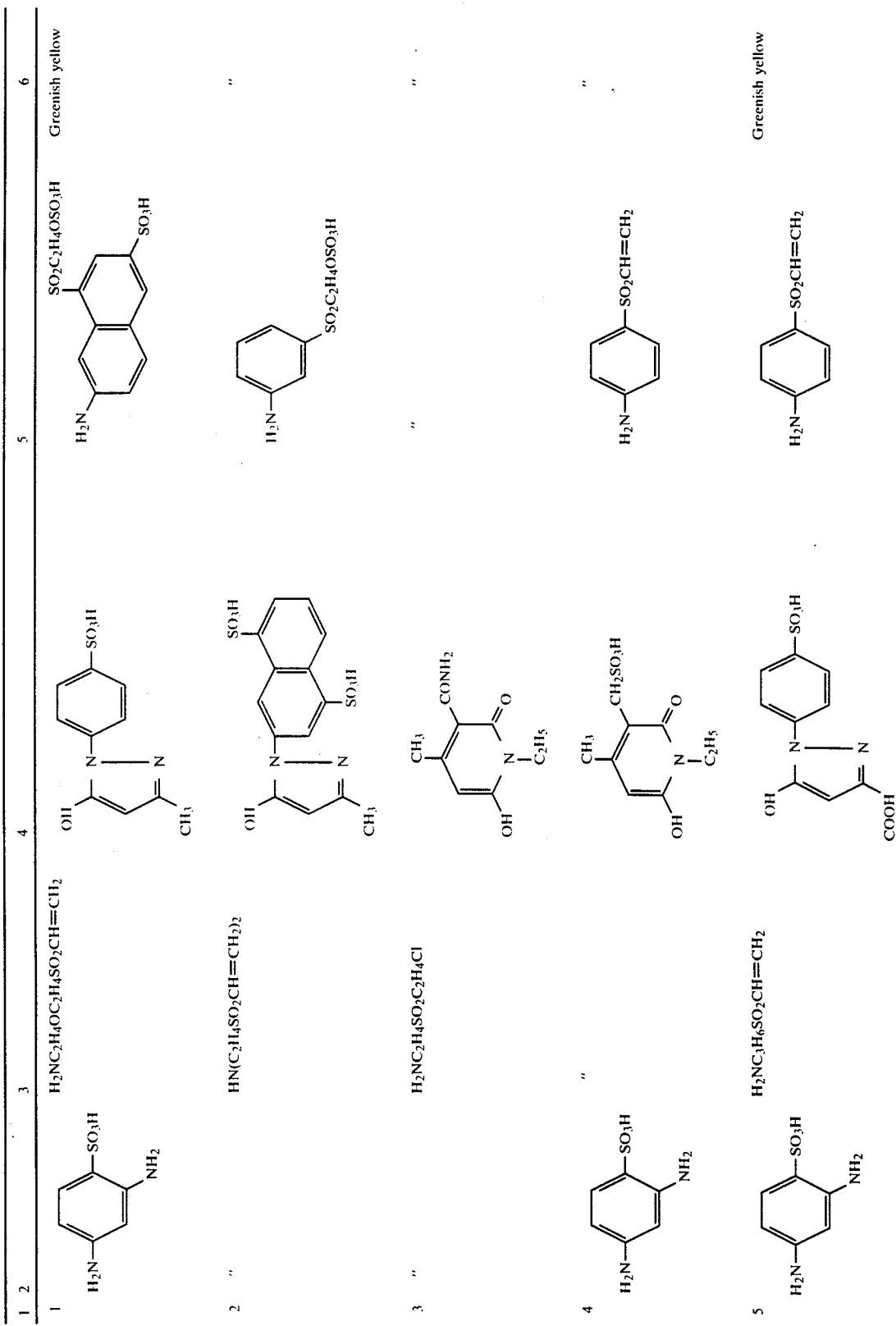

-continued

| 1 | 2 | 3 | 4 | 5 | 6 |
|---|---|---|---|---|---|
| 6 | 2-aminobenzene with SO₃H (top) and H₂N (bottom para) — aminobenzenesulfonic acid derivative | H₂NC₂H₄OC₂H₄SO₂CH=CH₂ | Benzene with COCH₃, OCH₃, CH₂, CONH, SO₃H substituents | 3-aminophenyl-SO₂C₂H₄OSO₃H (H₂N-C₆H₄-SO₂C₂H₄OSO₃H) | " |
| 7 | " | HN(C₂H₄SO₂C₂H₄Cl)₂ | Benzene with COCH₃, OCH₃, CH₂, CONH, CH₃, SO₃H | " | " |
| 8 | Benzene with SO₃H, NH₂, H₂N, SO₃H | H₂NC₃H₆SO₂C₂H₄OSO₃H | Benzene with COCH₃, OCH₃, CH₂, CONH, SO₃H, SO₃H | " | " |
| 9 | Benzene with SO₃H, NH₂, H₂N, SO₃H | H₂NC₂H₄SO₂C₂H₄Cl | Naphthalene with OH, NHCOCH₃, SO₃H | H₂N-C₆H₄-SO₂C₂H₄OSO₃H | Orange |
| 10 | 2-aminobenzene with SO₃H and H₂N (para) | H₂NC₂H₄OC₂H₄SO₂C₂H₄Cl | Naphthalene with OH, NHCOCH₃, SO₃H | " | " |
| 11 | " | H₂NC₂H₄OC₂H₄SO₂CH=CH₂ | Naphthalene with OH, NHCOCH₃, SO₃H, SO₃H | " | Red |

-continued
| 1 | 2 | 3 | 4 | 5 | 6 |
|---|---|---|---|---|---|
| 12 | " | " | 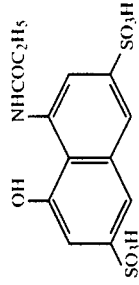 | " | " |
| 13 | 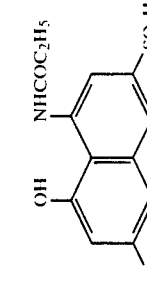 | H$_2$NC$_2$H$_4$SO$_2$C$_2$H$_4$OSO$_3$H | 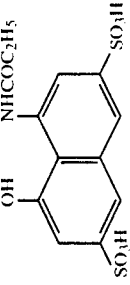 | 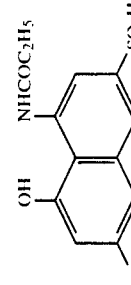 | Red |
| 14 | " | HN(C$_2$H$_4$SO$_2$CH=CH$_2$)$_2$ | " | " | " |
| 15 | " | H$_2$NC$_2$H$_4$OC$_2$H$_4$SO$_2$CH=CH$_2$ | 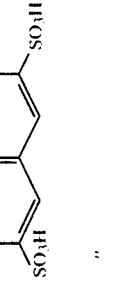 | " | " |
| 16 |  | HN(C$_2$H$_4$SO$_2$C$_2$H$_4$Cl)$_2$ | 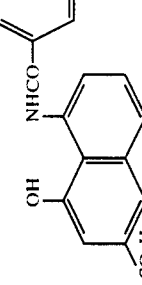 | | |
| 17 |  | H$_2$NC$_2$H$_4$OC$_2$H$_4$SO$_2$CH=CH$_2$ | 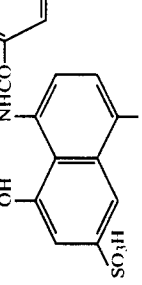 | 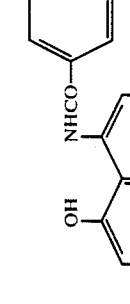 | Red |

| 1 | 2 | 3 | 4 | 5 | 6 |
|---|---|---|---|---|---|
| 18 | " | " | (structure) | " | Greenish blue |
| 19 | " | HN(C₂H₄SO₂CH=CH₂)₂ | " | " | " |
| 20 | " | H₂NC₂H₄SO₂C₂H₄Cl | " | " | " |
| 21 | (structure) | H₂NC₃H₆SO₂CH=CH₂ | (structure) | (structure) | Greenish blue |
| 22 | " | H₂NC₂H₄OC₂H₄SO₂CH=CH₂ | " | " | " |
| 23 | " | " | (structure) | " | " |
| 24 | " | H₂NC₂H₄SO₂C₂H₄OSO₃H | " | " | " |
| 25 | (structure) | H₂NC₂H₄SO₂C₂H₄Cl | (structure) | (structure) | Greenish blue |

-continued

| 1 | 2 | 3 | 4 | 5 | 6 |
|---|---|---|---|---|---|
| 26 | 2-amino-4-aminobenzenesulfonic acid structure (H₂N, NH₂, SO₃H) | H₂NC₂H₄SO₂C₂H₄OSO₃H | 1-amino-8-hydroxy-naphthalene-3,6-disulfonic acid coupled with o-sulfophenyl diazo | N-ethyl-3-(β-sulfatoethylsulfonyl)aniline (HN(C₂H₅), SO₂C₂H₄OSO₃H) | " |
| 27 | " | H₂NC₂H₄OC₂H₄SO₂CH=CH₂ | 1-amino-8-hydroxy-naphthalene-4,8-disulfonic acid coupled with naphthyl diazo (SO₃H, SO₃H) | " | " |
| 28 | " | HN(C₂H₄SO₂C₂H₄Cl)₂ | " | " | " |
| 29 | same as 26 | H₂NC₂H₄SO₂C₂H₄OSO₃H | 1-amino-8-hydroxy-naphthalene-3,6-disulfonic acid coupled with 2,5-disulfophenyl diazo | 3-(β-sulfatoethylsulfonyl)aniline (H₂N, SO₂C₂H₄OSO₃H) | Greenish blue |
| 30 | " | " | same structure with 2,4-disulfophenyl diazo | " | " |

EXAMPLE 11

Each of the triazine compounds obtained in Examples 9 and 10 (0.1, 0.3 and 0.6 part portions of every compound) was dissolved into water (200 parts). After adding sodium sulfate (10 parts) and cotton (10 parts), the temperature was elevated to 60° C., sodium carbonate (4 parts) was added, and dyeing was carried out for one hour. The dyed cotton was washed with water, soaped, again washed with water and dried to obtain a dyed product. The dyed products thus obtained were excellent in fastnesses and good in build-up property, and their hues were as shown in Column 6 of the table.

EXAMPLE 12

Using each of the triazine compounds obtained in Examples 9 and 10, color pastes having the following composition were prepared:

|  |  |
|---|---|
| Compound | 5 parts |
| Urea | 5 parts |
| Sodium alginate (5%) stock paste | 50 parts |
| Hot water | 25 parts |
| Sodium bicarbonate | 2 parts |
| Balance | 13 parts. |

A mercerized cotton broad cloth was printed with each color paste. After intermediate drying, it was steamed at 100° C. for 5 minutes, washed with hot water, soaped, again washed with hot water and dried. The printed products thus obtained were excellent in fastnesses, and their hues were as shown in Column 6 of the table.

EXAMPLE 13

2-Aminonaphthalene-3,6,8-trisulfonic acid (38.3 parts) was disazotized in the usual manner and coupled with m-toluidine (10.7 parts) in the usual manner. The monoazo compound thus obtained was subjected to a condensation reaction with cyanuric chloride (18.4 parts) and then with β-(β-chloroethylsulfonyl)ethylamine (17.2 parts). Finally, it was reacted with 1-aminobenzene-3-β-sulfatoethylsulfone (28.1 parts) and then salted out with sodium chloride to obtain a compound represented by the following formula in the free acid form:

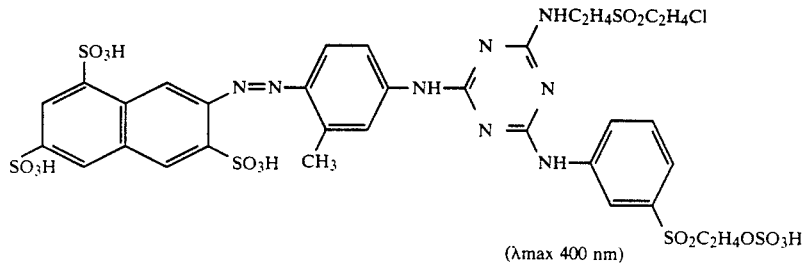

(λmax 400 nm)

EXAMPLE 14

Example 13 can be repeated, except that the 2-aminonaphthalene-3,6,8-trisulfonic acid, m-toluidine, β-(β-chloroethylsulfonyl)ethylamine and 1-aminobenzene-3-β-sulfatoethylsulfone used in Example 13 are replaced with the compounds of Column 2, 3, 4 and 5 of the following table, respectively, to obtain the corresponding triazine compounds. When used for dyeing, they give dyed products of which hues are as shown in Column 6 of the table.

| 1 | 2 | 3 | 4 | 5 | 6 |
|---|---|---|---|---|---|
| 1 | Naphthalene with NH₂, SO₃H, SO₃H, SO₃H substituents | 1,3-phenylene with NH₂ and NHCONH₂ | H₂NC₂H₄OC₂H₄SO₂CH=CH₂ | 3-aminophenyl-SO₂C₂H₄OSO₃H (H₂N-) | Reddish yellow |
| 2 | Naphthalene with NH₂, SO₃H, SO₃H | " | " | " | Yellow |
| 3 | " | 3-aminotoluene (NH₂, CH₃) | " | 3-(ethylamino)phenyl-SO₂C₂H₄OSO₃H (C₂H₅HN-) | " |
| 4 | " | 3-acetamidoaniline (NH₂, NHCOCH₃) | NH(C₂H₄SO₂C₂H₄Cl)₂ | " | " |
| 5 | Naphthalene with NH₂, SO₃H, SO₃H, SO₃H substituents | 3-acetamidoaniline (NH₂, NHCOCH₃) | H₂NC₂H₄SO₂C₂H₄OSO₃H | 3-aminophenyl-SO₂C₂H₄OSO₃H (H₂N-) | Reddish yellow |
| 6 | " | 3-ureidoaniline (NH₂, NHCONH₂) | NH(C₂H₄SO₂C₂H₄Cl)₂ | 4-aminophenyl-SO₂C₂H₄OSO₃H (H₂N-) | " |

| 1 | 2 | 3 | 4 | 5 | 6 |
|---|---|---|---|---|---|
| 7 | " | " | H₂NC₂H₄SO₂C₂H₄OSO₃H | 3-H₂N-C₆H₄-SO₂C₂H₄OSO₃H | " |
| 8 | " | 2-OCH₃, 5-CH₃, 3-NH₂-C₆H₂ | " | " | " |
| 9 | " | 8-NH₂-1,5-(SO₃H)₂-naphthalene; 4-NH₂-6-SO₃H-naphthalene linked by N=N to 1,5-(SO₃H)₂ | H₂NC₂H₄SO₂C₂H₄OSO₃H | 3-H₂N-C₆H₄-SO₂C₂H₄OSO₃H | Reddish brown |
| 10 | " | " | H₂NC₂H₄OC₂H₄SO₂CH=CH₂ | 3-H₂N-C₆H₄-SO₂C₂H₄OSO₃H | " |
| 11 | " | 3-CH₃-aniline | H₂NC₂H₄SO₂C₂H₄Cl | 3-(C₂H₅)HN-C₆H₄-SO₂C₂H₄OSO₃H | Brown |
| 12 | " | " | H₂NC₃H₆SO₂C₂H₄OSO₃H | 3-H₂N-C₆H₄-SO₂C₂H₄OSO₃H | " |

-continued
| 1 | 2 | 3 | 4 | 5 | 6 |
|---|---|---|---|---|---|
| 13 | 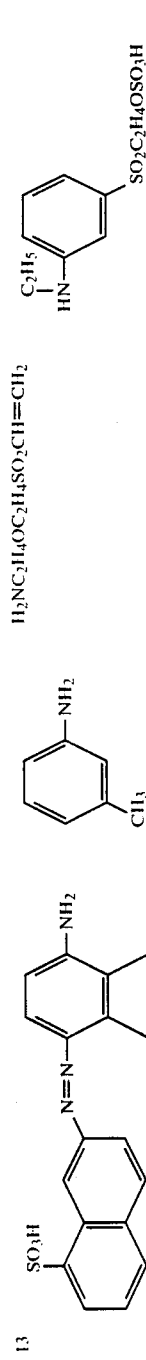 | 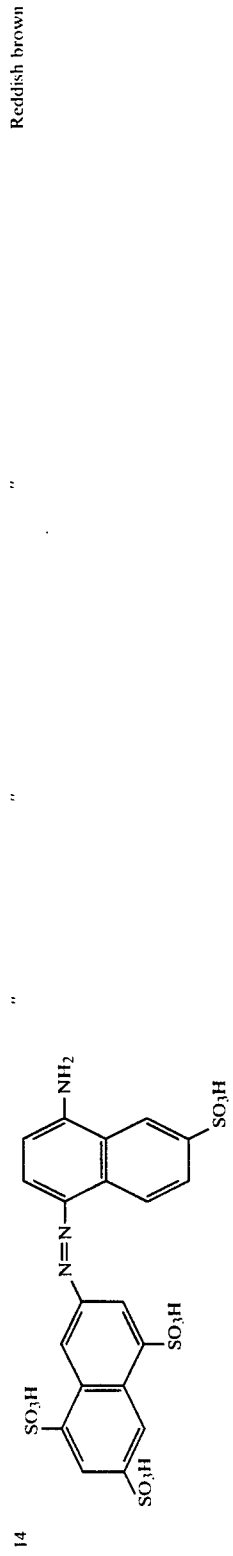 | H$_2$NC$_2$H$_4$OC$_2$H$_4$SO$_2$CH=CH$_2$ | 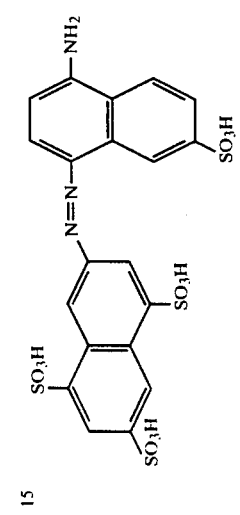 | Brown |
| 14 | | " | " | " | Reddish brown |
| 15 | | " | " | " | " |
| 16 | 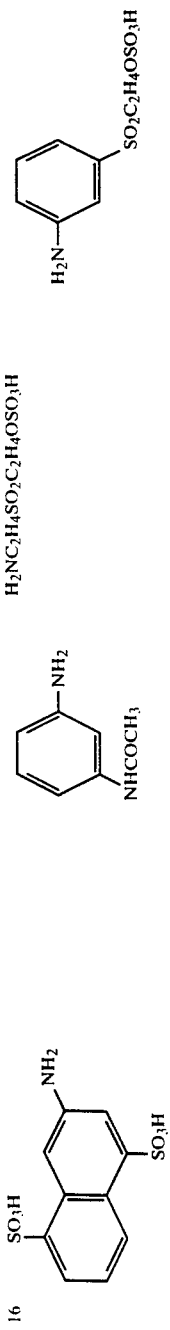 | | H$_2$NC$_2$H$_4$SO$_2$C$_2$H$_4$OSO$_3$H | | Yellow |

-continued

| | 2 | 3 | 4 | 5 | 6 |
|---|---|---|---|---|---|
| 17 | 3-amino-naphthalene-1,5-disulfonic acid structure (NH2, SO3H, SO3H) | 1,3-diamino with NHCOCH3 | H₂NC₂H₄SO₂C₂H₄OSO₃H | 3-(ethylamino)phenyl-SO₂C₂H₄OSO₃H (C₂H₅/HN) | Yellow |
| 18 | ″ | 3-methylaniline (NH2, CH3) | ″ | ″ | ″ |
| 19 | 3-amino-naphthalene-2,6,8-trisulfonic acid (NH2, SO3H, SO3H, SO3H) | | ″ | ″ | Reddish yellow |
| 20 | ″ | 1,3-diamino with NHCOCH3 | H₂NC₂H₄OC₂H₄SO₂CH=CH₂ | ″ | ″ |
| 21 | bis-azo naphthalene structure (NH2, SO3H, SO3H, N=N, SO3H) | 3-methylaniline (NH2, CH3) | H₂NC₂H₄SO₂C₂H₄OSO₃H | 3-aminophenyl-SO₂C₂H₄OSO₃H (H₂N) | Brown |

-continued

| 1 | 2 | 3 | 4 | 5 | 6 |
|---|---|---|---|---|---|
| 22 | ![structure: 1-amino-4-[(2,5-disulfophenyl)azo]naphthalene-6-sulfonic acid] | " | " | " | " |
| 23 | " | " | " | 3-(ethylamino)phenyl-SO$_2$C$_2$H$_4$OSO$_3$H | " |
| 24 | " | " | 3-methylaniline (NH$_2$, CH$_3$) | NH$_2$C$_2$H$_4$OC$_2$H$_4$SO$_2$CH=CH$_2$<br>H$_2$NC$_2$H$_4$SO$_2$C$_2$H$_4$OSO$_3$H | | " |
| 25 | ![structure: 1-amino-4-[(3-sulfophenyl)azo]naphthalene-6-sulfonic acid] | " | " | 3-(ethylamino)phenyl-SO$_2$C$_2$H$_4$OSO$_3$H | Brown |

EXAMPLE 15

Each of the triazine compounds obtained in Examples 13 and 14 (0.1, 0.3 and 0.6 part portions of every compound) was dissolved into water (200 parts). After adding sodium sulfate (10 parts) and cotton (10 parts), the temperature was elevated to 60° C., sodium carbonate (4 parts) was added and dyeing was carried out for one hour. The dyed cotton was washed with water, soaped, again washed with water and dried to obtain a dyed product. The dyed products thus obtained were excellent in fastnesses and good in build-up property, and their hues were as shown in Column 6 of the table.

EXAMPLE 16

Using each of the triazine compounds obtained in Examples 13 and 14, color pastes having the following composition were prepared:

| | |
|---|---|
| Compound | 5 parts |
| Urea | 5 parts |
| Sodium alginate (5%) stock paste | 50 parts |
| Hot water | 25 parts |
| Sodium bicarbonate | 2 parts |
| Balance | 13 parts. |

A mercerized cotton broad cloth was printed with each color paste. After intermediate drying, it was steamed at 100° C. for 5 minutes, washed with hot water, soaped, again washed with hot water and dried. The printed products thus obtained were excellent in fastnesses, and their hues were as shown in Column 6 of the table.

EXAMPLE 17

Copper phthalocyanine-tetrasulfochloride (97 parts), in the form of a wet filter cake, was introduced into ice water (500 parts) and suspended sufficiently, and then ethylene diamine (6 parts) was added thereto. After slowly heating the mixture up to 30° C., it was stirred at that temperature for 15 hours, during which pH value of the mixture was kept at 6-8 with 15% aqueous solution of sodium carbonate. Then, it was cooled to 5° C., cyanuric chloride (18 parts) was added, and the resulting mixture was stirred at 5°-20° C. while keeping its pH value at 6-8 with 15% aqueous solution of sodium carbonate, until completion of the condensation reaction.

Then, β-(β-chloroethylsulfonyl)ethylamine (17 parts) was added to the reaction mixture and stirred until completion of the reaction. Then, 1-aminobenzene-3-β-sulfatoethylsulfone (28 parts) was added, and the resulting mixture was stirred until completion of condensation reaction. Thus, a triazine compound represented by the following structural formula in the free acid form was obtained.

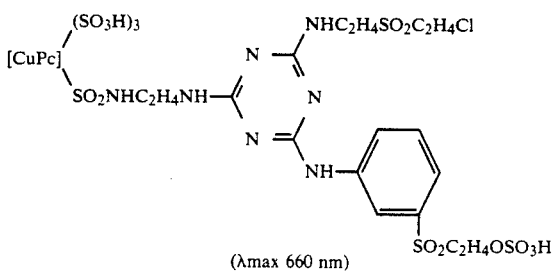

(λmax 660 nm)

EXAMPLE 18

Example 17 can be repeated, except that the ethylenediamine, β-(β-chloroethylsulfonyl)ethylamine and 1-aminobenzene-3-β-sulfatoethylsulfone used in Example 17 are replaced with the compounds of Columns 2, 3 and 4 of the following table, respectively, to obtain the corresponding compounds. When used for dyeing, these compounds give dyed products of which hues are as shown in Column 5 of the following table.

| 1 | 2 | 3 | 4 | 5 |
|---|---|---|---|---|
| 1 | $H_2NC_2H_4NH_2$ | $H_2NC_2H_4OC_2H_4SO_2CH=CH_2$ | 3-CH$_3$, HN-phenyl-SO$_2C_2H_4OSO_3H$ | Turquois blue |
| 2 | " | $HN(C_2H_4SO_2C_2H_4OSO_3H)_2$ | 3-C$_2$H$_5$, HN-phenyl-SO$_2C_2H_4OSO_3H$ | " |
| 3 | 2-SO$_3$H, 1,4-H$_2$N-phenyl-NH$_2$ | " | " | " |
| 4 | " | $H_2NC_2H_4OC_2H_4SO_2CH=CH_2$ | 1-H$_2$N-4-SO$_2C_2H_4OSO_3H$-phenyl | " |
| 5 | " | $H_2NC_2H_4SO_2C_2H_4Cl$ | " | " |

EXAMPLE 19

Each of the triazine compounds obtained in Examples 17 and 18 (0.1, 0.3 and 0.6 part portions of every compound) was dissolved into water (200 parts). After adding sodium sulfate (10 parts) and cotton (10 parts), the temperature was elevated to 60° C., sodium carbonate (4 parts) was added, and dyeing was carried out for one hour. The dyed cotton was washed with water, soaped, again washed with water and dried to obtain a dyed product. The dyed products thus obtained were excellent in fastnesses and good in build-up property, and their hues were as shown in Column 6 of the table.

EXAMPLE 20

Using each of the triazine compounds obtained in Examples 17 and 18, color pastes having the following composition were prepared:

| Compound | 5 parts |
|---|---|
| Urea | 5 parts |
| Sodium alginate (5%) stock paste | 50 parts |
| Hot water | 25 parts |
| Sodium bicarbonate | 2 parts |
| Balance | 13 parts. |

A mercerized cotton broad cloth was printed with each color paste. After intermediate drying, it was steamed at 100° C. for 5 minutes, washed with hot water, soaped, again washed with hot water and dried. The printed products thus obtained were excellent in fastnesses and had a turquois blue color.

We claim:

1. A triazine compound represented by the following formula (I) or a salt thereof:

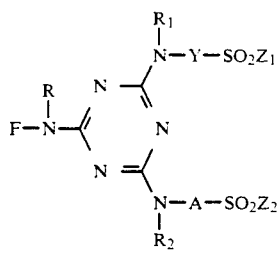

wherein R represents hydrogen or alkyl; $R_1$ represents hydrogen, an alkyl unsubstituted or substituted by carboxy, sulfo, alkoxy, halogeno, sulfato or hydroxy or $-Y-SO_2Z_3$; $R_2$ represents hydrogen or alkyl unsubsituted or substituted by hydroxy, cyano, alkoxy, halogeno, carbamoyl, carboxy, alkoxycarbonyl, alkylcarbonyloxy, sulfo or sulfonyl; A represents phenylene unsubstituted or substituted once or twice by a substituent selected from the group consisting of methyl, ethyl, methoxy, ethoxy, chloro, bromo, carboxy and sulfo or naphthylene unsubstituted or substituted by sulfo; Y represents a divalent group represented by the following formula (1), (2) or (3):

$$-CH_2-(W)- \quad (1)$$

$$-(CH_2)_n-O-(CH_2)_m-* \quad (2)$$

$$-(W_1)-N(R_4)-(W_2)-* \quad (3)$$

wherein W is a straight or branched chain $C_1-C_6$ alkylene substituted or substituted by chloro, bromo, fluoro, hydroxy, sulfato, cyano, $C_1-C_4$ alkylcarbonyloxy, $C_1-C_5$ alkoxycarbonyl, carboxy or carbamoyl; $W_1$ and $W_2$ independently of one another are each a straight or branched chain $C_2-C_6$ alkylene; $R_4$ is hydrogen or $C_1-C_6$ alkyl, m and n independently or one another are each 1-6; and the mark * means a bond linking to $$-N(R_1)-,$$

provided that $CH_2$ or (W) of the formula (1) as Y is linked to $$-N(R_1)-;$$

$Z_1$, $Z_2$ and $Z_3$ independently of one another are each $-CH=CH_2$ or $-CH_2CH_2Z'$ wherein $Z'$ is a group capable of being split by the action of an alkali; and F is any one of the following formula (4) to (19) in the free acid form:

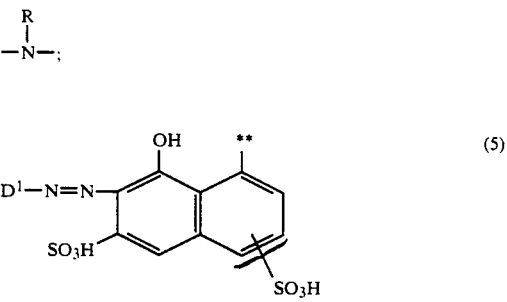

wherein T is an aliphatic, alicyclic or aromatic bridging group, $m_1$ is 0 or 1, and the mark ** means a bond linking to $$-N(R)-;$$

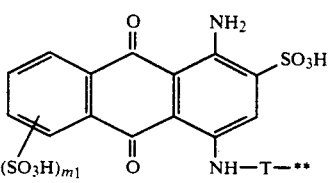

wherein $D^1$ is phenyl unsubstituted or substituted once or twice by a substituent selected from the group consisting of methyl, ethyl, methoxy, ethoxy, carboxy, chloro, bromo and sulfo or naphthyl unsubstituted or substituted once, twice or thrice by sulfo, and the mark ** is as defined above;

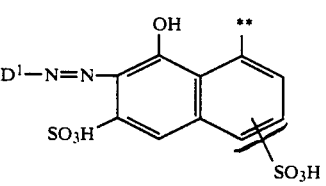

wherein $R^1$ is hydrogen, methyl, methoxy or sulfo, $R^2$ is alkyl or phenyl unsubstituted or substituted by methyl, ethyl, methoxy, ethoxy, chloro, bromo, nitro and sulfo, and the mark ** is as defined above;

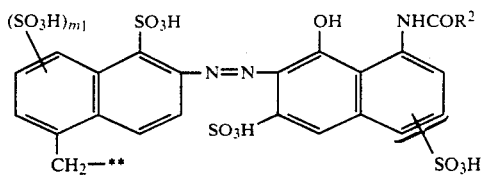   (7)

wherein $m_1$, $R^2$ and the mark ** are as defined above;

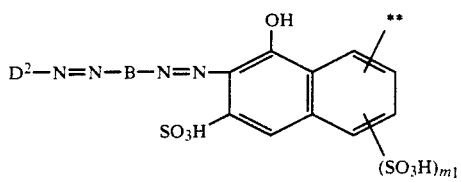   (8)

wherein B is

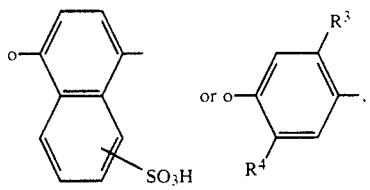

$D^2$ is phenyl unsubstituted or substituted once or twice by a substituent selected from the group consisting of methyl, ethyl, methoxy, ethoxy, carboxy, chloro, bromo and sulfo, or naphthyl unsubstituted or substituted once, twice or thrice by sulfo, $R^3$ is hydrogen, $C_1$-$C_4$ alkyl, $C_1$-$C_4$ alkoxy or sulfo, $R^4$ is hydrogen, halogeno, $C_1$-$C_4$ alkyl, $C_1$-$C_4$ alkoxy, $C_1$-$C_4$ acylamino $C_1$-$C_4$ alkylsulfonylamino or ureido, the mark ○ means a bond linking to $D^2$—N=N—, and $m_1$ and the mark ** are as defined above;

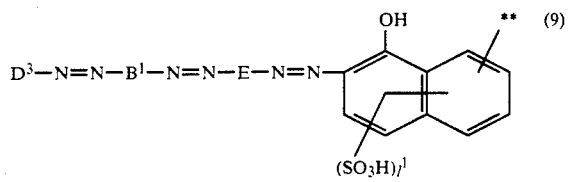   (9)

wherein the mark ** is as defined above, $D^3$ is phenyl unsubstituted or substituted once or twice by a substituent selected from the group consisting of methyl, methyl, methoxy, ethoxy, carboxy, chloro, bromo and sulfo, or naphthyl unsubstituted or substituted once, twice or thrice by sulfo.

$B^1$ is a group represented by

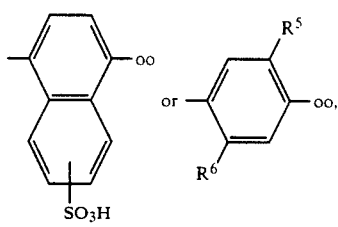

E is a group represented by

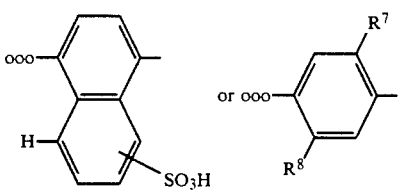

(in these formulas, the mark ○○ means a bond linking to the azo group of —N=N—E—, the mark ○○○ means a bond linking to the azo group of —N=N—$B^1$—, $R^5$ and $R^7$ independently of one another are each hydrogen, $C_1$-$C_4$ alkyl, $C_1$-$C_4$ alkoxy or sulfo, and $R^6$ and $R^8$ independently of one another are each hydrogen, halogen, $C_1$-$C_4$ alkyl, $C_1$-$C_4$ alkoxy, $C_1$-$C_4$ acylamino or ureido) and $l^1$ is 1 or 2;

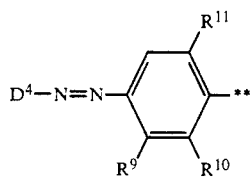   (10)

wherein the mark ** is as defined above, $R^9$ is hydrogen, halogeno, $C_1$-$C_4$ alkyl, $C_1$-$C_4$ alkoxy, $C_1$-$C_4$ acylamino or ureido, $R^{10}$ is hydrogen or, taken together with $R^9$, may form a ring, $R^{11}$ is hydrogen, $C_1$-$C_4$ alkyl, $C_1$-$C_4$ alkoxy or sulfo, and $D^4$ is phenyl unsubstituted or substituted once or twice by a substituent selected from the group consisting of methyl, ethyl, methoxy, ethoxy, carboxy, chloro, bromo and sulfo, unsubstituted or substituted once, twice or thrice by sulfo;

$$D^5-N=N-B^2-N=N-E^1-**$$   (11)

wherein the mark ** is as defined above, $B^2$ is a group represented by

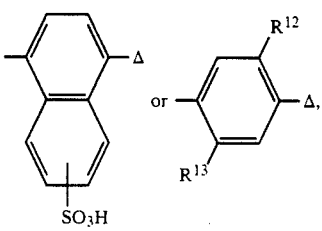

$E^1$ is a group represented by

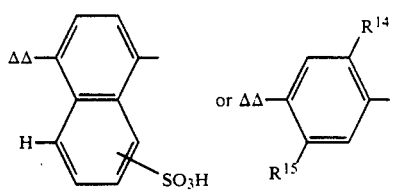

(in these formulas, the mark Δ means a bond linking the azo group of —N=N—E$^1$—, the mark ΔΔ means a bond linking to —B$^2$—N=N—, R$^{12}$ and R$^{14}$ independently of one another are each hydrogen, C$_1$-C$_4$ alkyl, C$_1$-C$_4$ alkoxy or sulfo, R$^{13}$ and R$^{15}$ independently of one another are each hydrogen, halogeno, C$_1$-C$_4$ alkyl, C$_1$-C$_4$ alkoxy, C$_1$-C$_4$ acylamino or ureido), and D$^5$ is phenyl unsubstituted or substituted once or twice by a substituent selected from the group consisting of methyl, ethyl, methoxy, ethoxy, carboxy, chloro, bromo and sulfo, or naphthyl unsubstituted or substituted one, twice or thrice by sulfo;

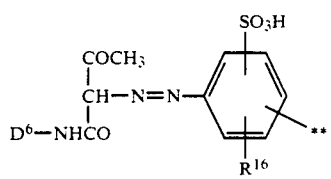
(12)

wherein the mark ** is as defined above, R$^{16}$ is hydrogen, methyl or sulfo, and D$^6$ is phenyl unsubstituted or substituted once or twice by a substituent selected from the group consisting of methyl, ethyl, methoxy, ethoxy, carboxy, chloro, bromo and sulfo, or naphthyl unsubstituted or substituted by sulfo;

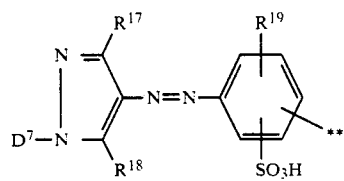
(13)

wherein the mark ** is as defined above, R$^{17}$ is methyl, carboxyl or C$_1$-C$_4$ alkoxycarbonyl, R$^{18}$ is hydroxyl or amino, R$^{19}$ is hydrogen, methyl or sulfo, and D$^7$ is phenyl unsubstituted or substituted once or twice by a substituent selected from the group consisting of methyl, ethyl, methoxy, ethoxy, carboxy, chloro, bromo and sulfo, or naphthyl unsubstituted or substituted by sulfo;

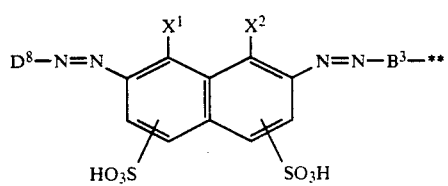
(14)

wherein the mark ** is as defined above, B$^3$ is a group represented by the following formula:

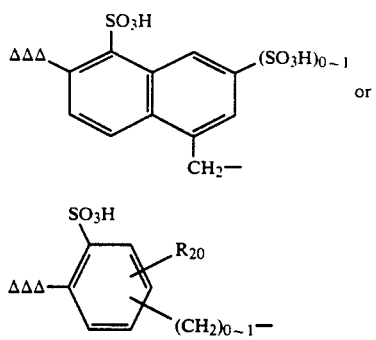

(in these formulas, the mark ΔΔΔ means a bond linking to an azo group, and R$^{20}$ is hydrogen, methyl, methoxy or sulfo), one of X$^1$ and X$^2$ is NH$_2$ group and the other is OH group, and D$^8$ is phenyl unsubstituted or substituted once or twice by a substituent selected from the group consisting of methyl, ethyl, methoxy, ethoxy, carboxy, chloro, bromo, nitro and sulfo, or naphthyl unsubstituted or substituted once, twice or thrice by sulfo;

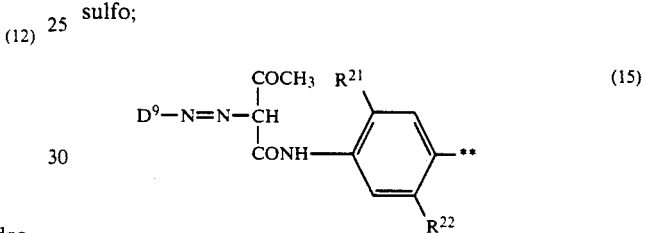
(15)

wherein the mark ** is as defined above, one of R$^{21}$ and R$^{22}$ is sulfo and the other is hydrogen, methoxy or ethoxy, and D$^9$ is phenyl unsubstituted or substituted once or twice by a substituent selected from the group consisting of methyl, ethyl, methoxy, ethoxy, carboxy, chloro, bromo and sulfo, or naphthyl unsubstituted or substituted once, twice or thrice by sulfo;

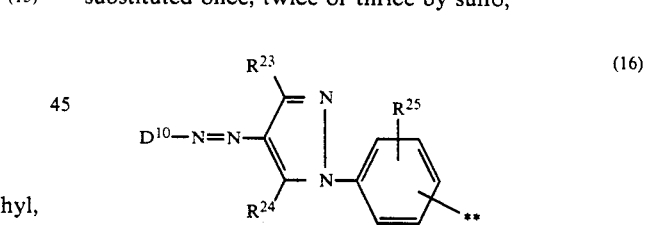
(16)

wherein the mark ** is as defined above, R$^{23}$ is methyl, carboxyl or C$_1$-C$_4$ alkoxycarbonyl, R$^{24}$ is hydroxyl or amino, R$^{25}$ is hydrogen, methyl or sulfo, and D$^{10}$ is phenyl unsubstituted or substituted once or twice by a substituent selected from the group consisting of methyl, ethyl, methoxy, ethoxy, carboxy, chloro, bromo and sulfo, or naphthyl unsubstituted or substituted once, twice or thrice by sulfo;

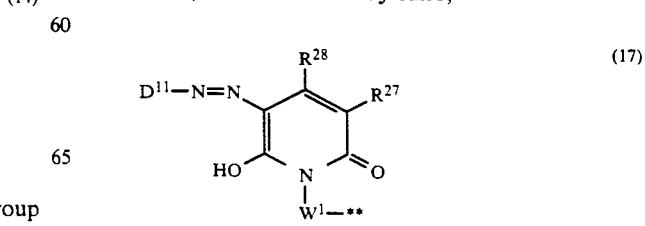
(17)

wherein the mark ** is as defined above, $R^{27}$ is hydrogen, cyano, carbamoyl, sulfo, sulfomethyl or halogeno, $R^{28}$ is $C_1$-$C_4$ alkyl, $D^{11}$ is phenyl unsubstituted once or twice by a substituent selected from the group consisting of methyl, ethyl, methoxy, ethoxy, carboxy, chloro, bromo and sulfo, or naphthyl unsubstituted or substituted once, twice or thrice by sulfo, and $W^1$ is $C_2$-$C_6$ alkylene;

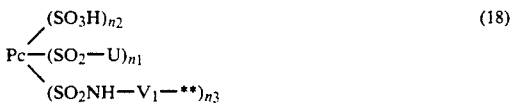
(18)

wherein the mark ** is as defined above, $P_c$ particularly represents the phthalocyanine nucleus of copper phthalocyanine or nickel phthalocyanine, U is amino, $V_1$ is an aliphatic, alicyclic or aromatic bridging group, $n_1$ is 0, 1 or 2, $n_2$ is 1, 2 or 3, and $n_3$ is 1, 2 or 3, provided that $2 \leq n_1 + n_2 + n_3 \leq 4$ and $1 \leq n_1 + n_2 \leq 3$;

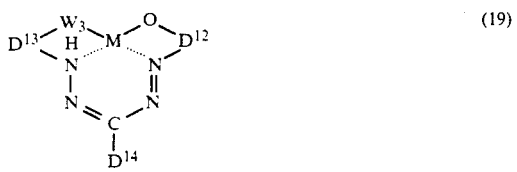
(19)

wherein M is copper or nickel, $W_3$ is —O— or —COO—, $D^{12}$ and $D^{13}$ are each a mono or poly-nuclear arylene group bonded at its ortho carbon atoms, and $D^{14}$ is an aliphatic, alicyclic or aromatic hydrocarbon group, provided that one of $D^{14}$, $D^{12}$ and $D^{13}$ is linked to

2. A compound according to claim 1 or salt thereof, wherein R is hydrogen or methyl.

3. A compound according to claim 1 or a salt thereof, wherein $R_2$ is hydrogen, methyl or ethyl, and A is a phenylene group unsubstituted or substituted once or twice by a substituent selected from the group consisting of methyl, methoxy, carboxy, chloro and sulfo or a naphthylene group unsubstituted or substituted by sulfo.

4. A compound according to claim 1 or a salt thereof, wherein $Z_1$, $Z_2$ and $Z_3$ independently of one another are each vinyl, β-sulfatoethyl or β-chloroethyl.

5. A compound according to claim 1 or a salt thereof, wherein Y is $-(CH_2)_2-$, $-(CH_2)_3-$ or $-(CH_2)_2O-(CH_2)_2-$.

6. A compound according to claim 2 or a salt thereof, wherein $R_2$ is hydrogen, methyl or ethyl, and A is a phenylene group unsubstituted or substituted once or twice by a substituent selected from the group consisting of methyl, methoxy, carboxy, chloro and sulfo or a naphthylene group unsubstituted or substituted by sulfo.

7. A compound according to claim 2 or a salt thereof, wherein $Z_1$, $Z_2$ and $Z_3$ independently or one another are each vinyl, β-sulfatoethyl or β-chloroethyl.

8. A compound according to claim 2 or a salt thereof, wherein Y is $-(CH_2)_2-$, $-(CH_2)_3-$ or $-(CH_2)_2O-(CH_2)_2-$.

9. A compound according to claim 3 or a salt thereof, wherein $Z_1$, $Z_2$ and $Z_3$ independently or one another are each vinyl, β-sulfatoethyl or β-chloroethyl.

10. A compound according to claim 3 or a salt thereof, wherein Y is $-(CH_2)_2-$, $-(CH_2)_3-$ or $-(CH_2)_2O-(CH_2)_2-$.

11. A compound according to claim 4 or a salt thereof, wherein Y is $-(CH_2)_2-$, $-(CH_2)_3-$ or $-(CH_2)_2O-(CH_2)_2-$.

12. A compound according to claim 6 or a salt thereof, wherein $Z_1$, $Z_2$ and $Z_3$ independently of one another are each vinyl, β-sulfatoethyl or β-chloroethyl.

13. A compound according to claim 6 or a salt thereof, wherein Y is $-(CH_2)_2-$, $-(CH_2)_3-$ or $-(CH_2)_2O-(CH_2)_2-$.

14. A compound according to claim 7 or a salt thereof, wherein Y is $-(CH_2)_2-$, $-(CH_2)_3-$ or $-(CH_2)_2O-(CH_2)_2-$.

15. A compound according to claim 9 or a salt thereof, wherein Y is $-(CH_2)_2-$, $-(CH_2)_3-$ or $-(CH_2)_2O-(CH_2)_2-$.

16. A compound according to claim 12 or a salt thereof, wherein Y is $-(CH_2)_2-$, $-(CH_2)_3-$ or $-(CH_2)_2O-(CH_2)_2-$.

17. A process for dyeing or printing fiber materials which comprises using the triazine compound according to claim 1.

* * * * *